United States Patent
Feldman et al.

(10) Patent No.: US 7,490,296 B2
(45) Date of Patent: Feb. 10, 2009

(54) UTILITY OBJECT FOR SPECIALIZED DATA ENTRY

(75) Inventors: Kyril Feldman, Kirkland, WA (US); Robert L Chambers, Sammamish, WA (US); Steve Dodge, Sammamish, WA (US); Takanobu Murayama, Seattle, WA (US); Tobiasz Zielinski, Redmond, WA (US); Todd A Torset, Woodinville, WA (US); Thomas R Wick, Seattle, WA (US); Adrian J Garside, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 902 days.

(21) Appl. No.: 10/427,159

(22) Filed: Apr. 30, 2003

(65) Prior Publication Data
US 2004/0150670 A1 Aug. 5, 2004

Related U.S. Application Data

(60) Provisional application No. 60/453,701, filed on Jan. 31, 2003, provisional application No. 60/444,444, filed on Feb. 1, 2003.

(51) Int. Cl.
*G06F 3/01* (2006.01)
(52) U.S. Cl. .................................... 715/780
(58) Field of Classification Search .................. 715/780
See application file for complete search history.

(56) References Cited

U.S. PATENT DOCUMENTS

| | | | | |
|---|---|---|---|---|
| 5,651,107 A | * | 7/1997 | Frank et al. .................. | 715/768 |
| 5,798,752 A | * | 8/1998 | Buxton et al. ................ | 715/863 |
| 5,812,697 A | * | 9/1998 | Sakai et al. .................. | 382/186 |
| 5,936,614 A | * | 8/1999 | An et al. ...................... | 345/173 |
| 7,305,627 B2 | * | 12/2007 | Tannenbaum ................ | 715/751 |
| 2003/0163525 A1 | * | 8/2003 | Hendriks et al. ............ | 709/204 |
| 2004/0070573 A1 | * | 4/2004 | Graham ....................... | 345/179 |

OTHER PUBLICATIONS

Screen Dumps of East (1999, pp. 1-4).*

* cited by examiner

*Primary Examiner*—Stephen S Hong
*Assistant Examiner*—Le Nguyen
(74) *Attorney, Agent, or Firm*—Woodcock Washburn LLP

(57) ABSTRACT

An object is associated with one or more controls in a software application. An object associated with a control determines the operation of the data entry user interface when the data entry user interface is being employed to enter data into that control. More particularly, the object may communicate interface characteristics to a component that is responsible for providing the user interface to the user. Such a component may be, for example, a shared software module that renders the user interface on a display, receives input data from the user through the user interface, and routes the entered data to a designated destination. Alternately, the object itself may create a user interface having the specified characteristics.

25 Claims, 17 Drawing Sheets

UTILITY OBJECT FOR SPECIALIZED DATA ENTRY

RELATED APPLICATIONS

This application claims priority to copending U.S. Provisional Patent Application No. 60/453,701, filed on Jan. 31, 2003, entitled "Utility Object For Specialized Data Entry," and naming Kyril Feldman et al. as inventors, which application is incorporated entirely herein by reference. This application also claims priority to copending U.S. Provisional Patent Application No. 60/444,444, filed on Feb. 1, 2003, entitled "Synchronous Data Exchange Between In-Process Components And A Shared Singleton," and naming Tobias Zielinski et al. as inventors, which copending application also is incorporated entirely herein by reference.

FIELD OF THE INVENTION

The invention relates generally to an object for invoking or controlling a data entry user interface. Various embodiments of the invention have particular application to the invocation or control of a data entry user interface based upon a control that will receive input data from the user interface, such as an edit control or a rich edit control.

BACKGROUND OF THE INVENTION

As computers have evolved, a variety of data entry techniques have been developed to enhance the user's experience and to make computers more versatile. For example, typical computer systems, especially computer systems using graphical user interfaces (GUI) for user interaction, such as the Microsoft WINDOWS® brand operating system, are optimized for accepting user input from one or more discrete input devices. Thus, a computer user may enter text with a keyboard, and control the position of a pointer on a display screen with a pointing device, such as a mouse, having one or more buttons for activating user selections associated with the location of the pointer. Some computing systems even have expanded the input systems available to a user by providing a pen-like stylus that can be used as a multipurpose data input device.

For example, the Microsoft WINDOWS® brand XP Tablet PC Edition operating system provides a data entry user interface, referred to as the Tablet PC Input Panel, text input panel, or TIP, through which a user can employ a pen or stylus to submit data into a computer. This type of user interface falls into the broader category of a data entry graphical user interfaces, which may be generically referred to as data input panels. A data input panel may provide a writing surface, which converts movement of the stylus across the surface into electronic ink. Some versions of the data input panel can then translate the electronic ink into text, while other types of data input panels can alternately or additionally provide the electronic ink directly to an application running on the computer. A data input panel may also provide a "soft" keyboard surface that displays the characters of a conventional keyboard. If the user employs a stylus to tap on a displayed key, then the computer will receive the character associated with that key as input data.

While the data input panel substantially increases the usefulness of a computer, there are still some inconveniences associated with conventional data input panels. First, many computer users are unfamiliar with data input panels. Thus, a developer creating a software application cannot be certain that a user will know how to manually summon a data input panel to enter data into the application. Instead, the developer must hope that the user will be able to activate and use the data input panel or have an alternate data input method available.

Also, because the data input panel is a graphical user interface, it is typically displayed simultaneously with the application into which the data from the data input panel will be entered. To avoid having the data input panel actually obscure the location into which the data will be entered, the data input panel is usually "docked" below the application. While positioning the data input panel in this fashion ensures that it will not prevent the user from viewing the destination location for the data, it is sometimes inconvenient for the user to continuously move the stylus back-and-forth between the application (to control the application) and the data input panel (to enter data into the application).

Further, because of the variety of data input techniques offered by a typical data input panel, it is often inconvenient for a user to determine which technique is the most appropriate for entering data into a particular location in an application. For example, an application may contain an edit control for receiving a case-sensitive password. If, however, the user attempts to enter a password into the edit control by writing on a writing surface provided by a data input panel, the user's handwriting may be incorrectly recognized. Further, if the edit control does not display the incorrectly recognized handwriting but rather intentionally hides the incorrectly recognized text, the user may not even realize why his or her password is not being accepted. In this situation, it might be preferable for the user to instead enter data into the edit control using a soft keyboard rather than the writing surface, but the user must realize that the soft keyboard surface is more appropriate for the task and change the data input panel to that display surface himself.

BRIEF SUMMARY OF THE INVENTION

Accordingly, it would be advantageous to be able to display a data input panel near the location at which data from the input panel will be inserted, but without inadvertently obscuring that location. More particularly, it would be advantageous to be able to intelligently display the data input panel at a location that would allow the user to simultaneously focus his or her attention on both the data input panel and the insertion of the data entered through the data input panel to an application. In addition, it would be advantageous to allow an application to designate a variety of characteristics for a data input panel surface that would be the most appropriate for entering data into a control in the application. For example, if an application included an edit control for receiving a case-sensitive password, it would be useful to allow the application to automatically change the surface of a data input panel to a keyboard surface when the user seeks to enter data into that edit control.

Conveniently, various embodiments of the invention provide an object that allows an application to control one or more characteristics of a data input panel, including the position and/or appearance of the data input panel. According to some embodiments of the invention, the object is associated with one or more edit controls in an application. For example, with some embodiments of the invention, when the input focus of a computer's operating system shifts to an edit control associated with that object, the object will designate the location at which the data input panel will be displayed. With still other embodiments of the invention, when the input focus of the computer's operating system shifts to an edit control associated with the object, the object will designate the surface displayed by the data input panel. For still other embodiments of the invention, when the input focus of the computer's operating system changes to an edit control associated with the object, the object will designate the overall appearance of the data input panel. That is, the object will designate both the location of the data input panel and the surface displayed by the data input panel. With still other embodiments of the invention, an object may additionally or alternately determine how the data input panel will be invoked by the user.

BRIEF DESCRIPTION OF THE DRAWINGS

FIG. 2A illustrates edit control windows in an application user interface that may be employed with various embodiments of the invention, while

DETAILED DESCRIPTION OF THE INVENTION

Overview

Figure 1:
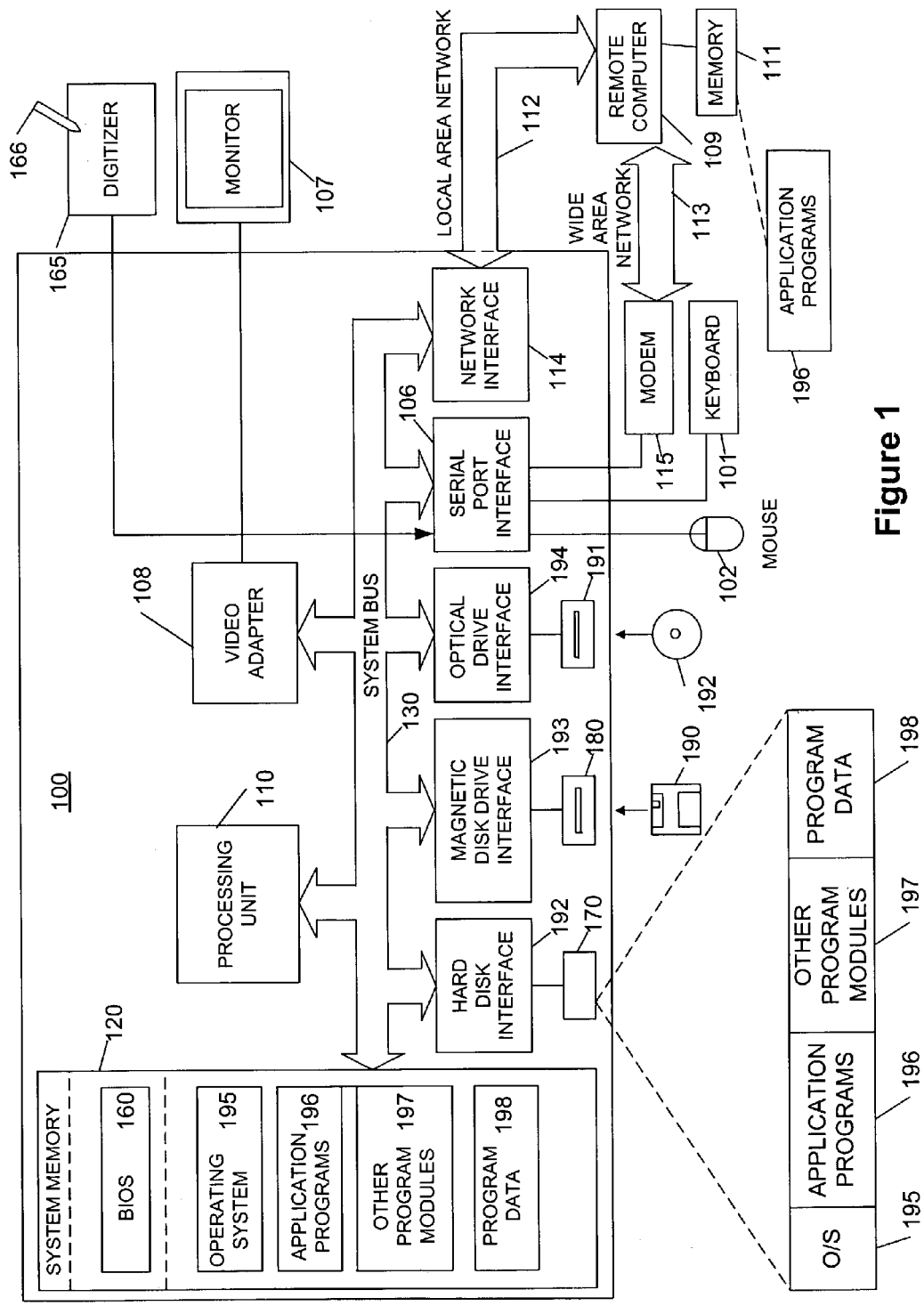
FIG. 1 illustrates a general operating environment according to an illustrative embodiment of the invention.

Aspects of the present invention relate to controlling the behavior of a data entry user interface, such as a data input panel. More particularly, various embodiments of the invention relate to controlling both the location and contents of a data input panel. As will be appreciated by those of ordinary skill in the art, most software applications typically have some type of feature or component for accepting input data from a user. With applications having graphical user interfaces, these features or components are typically referred to as controls. Thus, a control is displayed object that can be manipulated by the user to perform an action. Some other examples of controls include, for example, buttons that can be checked by a user through the use of a pointing device, and scroll bars, which also may be manipulated through a pointing device. A containing window is still another type of control, which allows a user to manipulate the contents of a window. As will be appreciated by those of ordinary skill in the art, the characteristics and behavior of a control are typically specified by the application hosting the control.

Bounded areas into which a user can enter text data with, for example, a keyboard, are commonly referred to as edit controls. As will be appreciated by those of ordinary skill in the art, there are a variety of different types of edit controls. For example, in addition to conventional edit controls that accept character data from a keyboard, the Microsoft Windows® brand XP operating system allows applications to include a rich edit control. A rich edit control accepts both input text and various types of metadata associated with the inserted text. Also, the Microsoft Windows® brand XP Tablet PC Edition operating system allows an application to include an ink edit control. An ink edit control is a type of rich-edit control that additionally permits a user to enter data into the control by manipulating a stylus-type pointing device to create electronic ink. With some ink edit controls, the ink may then be converted into text, while other types of ink edit controls may process the electronic ink without translating it into text.

According to various embodiments of the invention, an object is associated with one or more such controls. An object associated with a control in an application will then determine the operation of the data entry user interface when the data entry user interface is being employed to enter data into that control. More particularly, an object according to the invention may communicate interface characteristics to a component that is responsible for providing the user interface to the user. Such a component may be, for example, a shared software module that renders the user interface on a display, receives input data from the user through the user interface, and routes the entered data to a designated destination. Alternately, the object itself may create a user interface having the specified characteristics.

For example, an object associated with a control may determine the appearance of a data entry user interface, such as a data input panel, when the input focus of the computer's operating system shifts to that control. With some embodiments of the invention, the object will cause the data input panel to be displayed close to the boundaries of the control. For example, the object may cause the data input panel to be displayed just below or just above the boundary of an edit control. Additionally, the object may determine the surface initially displayed by the data input panel. For example, if the object is associated with an edit control that receives random characters, such as a password or model number, or hides received characters, then the object may force the data input panel to initially display a keyboard surface rather than a writing surface for entering data into that control.

Still further, the object may be used to determine the technique by which a data entry user interface, such as a data input panel, may be invoked. For example, an object may force a data input panel to be invoked whenever the input focus of the computer's operating system shifts to a control associated with that object. Alternately, the object may cause a target to be displayed when the focus of the computer's operating system changes to a control associated with that object. With various embodiments of the invention, the target will then invoke the data input panel (as specified by the object) when the user passes a stylus over the target, depressing an activation button while a pointer is pointing to the target, or when the user performs some other specified action with respect to the target.

Thus, by setting the property values of the object and calling various methods on the object, an application can determine the characteristics of a data entry user interface, such as a data input panel that will be displayed to a user. Further, by executing methods provided by the object, an application can change the characteristics of the data entry user interface in response to the user's actions, or control how data entered through the user interface will be delivered to the control. Each of these features of the invention will be described in more detail below.

Exemplary Operating Environment

As will be appreciated by those of ordinary skill in the art, the object according to various embodiments of the invention can be implemented using hardware, software, firmware, or a combination thereof. For example, various embodiments of the invention can be implemented by functional modules that perform the operations of the object in controlling the operation of a data entry user interface. Each of the modules may be formed solely from analog or digital electronic circuitry. As will be appreciated by those of ordinary skill in the art, however, the modules may also be formed using executable software instructions for controlling programmable electronic circuitry, such as found in conventional programmable computing devices like personal and laptop computers.

More particularly, an object according to various embodiments of the invention may be described in the general context of computer-executable instructions, such as program modules, executed by one or more programmable computing devices. Generally, program modules may include routines, programs, objects, components, data structures, etc. that perform particular tasks or implement particular abstract data types. Typically the functionality of the program modules may be combined or distributed as desired in various embodiments.

Because various embodiments of the invention may be implemented using programmable computer devices programmed with software, it may be helpful for a better understanding of the invention to briefly discuss the components and operation of a typical programmable computing device (hereafter referred to simply as a computer) on which various embodiments of the invention may be employed. FIG. 1 is a functional block diagram of an example of a conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In some embodiments, a pen digitizer 165 and accompanying pen or stylus 166 are provided in order to digitally capture freehand input, such as ink. Although a direct connection between the pen digitizer 165 and the serial port is shown, in practice, the pen digitizer 165 may be coupled to the processing unit 110 directly, via a parallel port or other interface and the system bus 130 as known in the art. Furthermore, although the digitizer 165 is shown apart from the monitor 107, in many embodiments of the invention, the usable input area of the digitizer 165 is co-extensive with the display area of the monitor 107. Further still, the digitizer 165 may be integrated in the monitor 107, or may exist as a separate device overlaying or otherwise appended to the monitor 107.

Application programs 196 and program modules 197 may include a parsing module and a recognition module for use in receiving and analyzing ink input via the stylus 166. The parsing module may be used to analyze received strokes and group the strokes into ink objects (e.g., characters, words, drawings, etc.). The recognition module may be used to analyze ink objects and perform character recognition on alphanumeric ink objects. The recognition information may then be stored as a property of the ink object. Examples of such parsing and recognition modules are available from Microsoft Corporation of Redmond, Washington in the Tablet PC Platform Software Development Kit (SDK).

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet and use both wired and wireless communication protocols.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are illustrative and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

One or more aspects of the invention may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

Behavior of the Data Entry User Interface

Overview

As previously noted, an object according to various embodiments of the invention may be used by an application to control any characteristic of a data entry graphical user interface. For example, an object according to the invention may be used by an application to control both the location and appearance of a user interface, such as a data input panel. The implementation of these particular features according to various environments of the invention will be discussed in detail below.

Positioning of the User Interface

One feature of a utility object according to various embodiments of the invention is the ability to position a data entry graphical user interface, such as a data input panel, anywhere in a work space designated by the application receiving data from the data entry graphical user interface. With some embodiments of the invention, the work space may be any space displayed to a user. Alternately, the work space may be any space in which the data entry graphical user interface can receive input data from a user. For example, if the data entry graphical user interface receives input data through the movement of a stylus across a surface, then the work space may be the space corresponding to the portion of the surface that can detect movement of the stylus.

Thus, a utility object according to some embodiments of the invention may provide an application with the ability to position a data entry graphical user interface close to the control into which data from the user interface will be submitted. For example, if the control is an edit control, a utility object according to the invention can position a data entry user interface close to the edit control, so that the user can simultaneously view both the user interface and the entry of data into the control. This feature is particularly useful when, for example, the user is employing the data entry user interface to enter data into a variety of edit controls spread out over a wide area, such as a form.

Figure 2A:
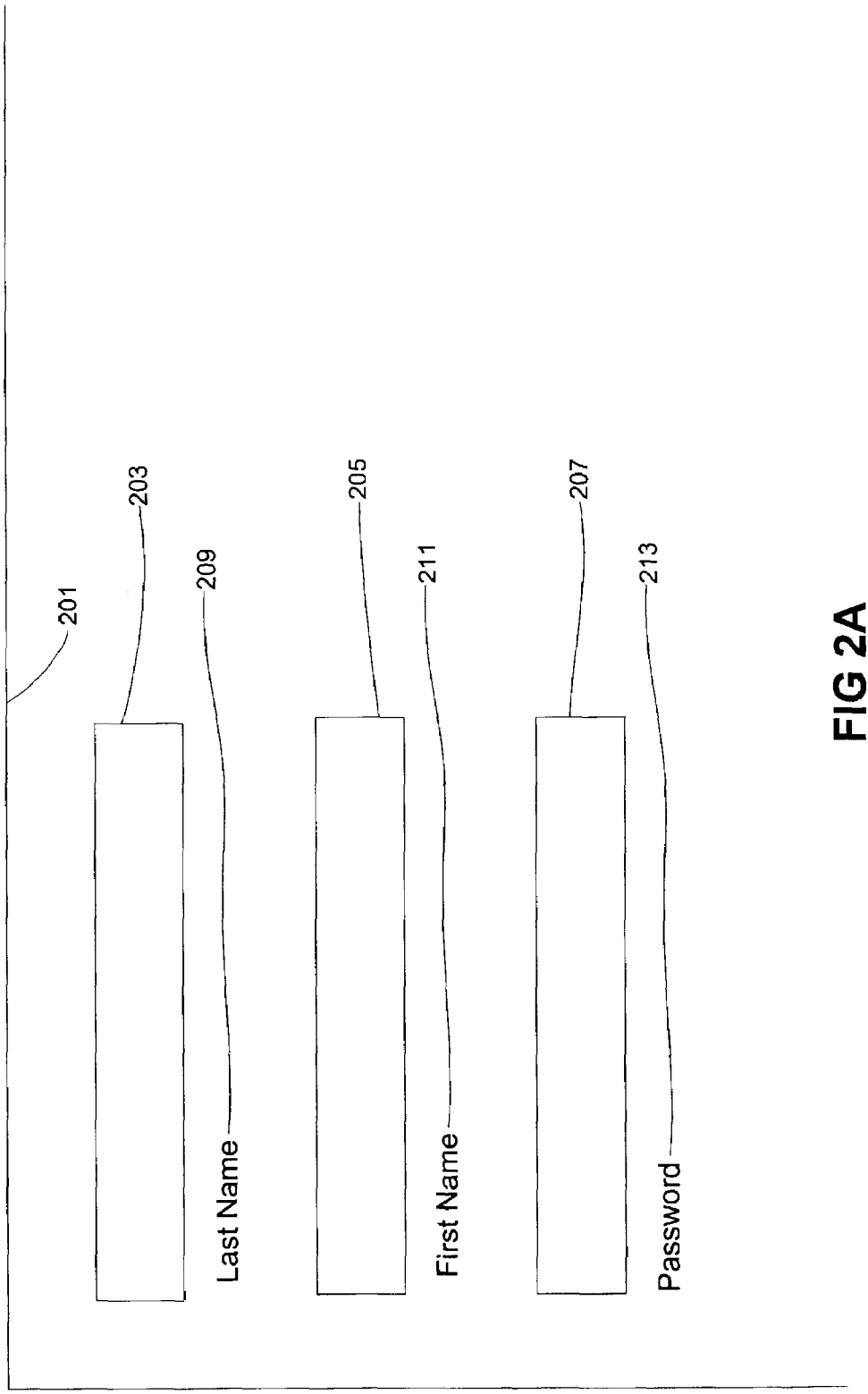

FIG. 2A illustrates one example of a graphical user interface for application. As seen in this figure, the workspace on which the graphical user interface of the application is displayed has a boundary 201. As previously noted, the boundary 201 may be the edge of a display area. Alternately, the boundary 201 may be the edge of a displayed space corresponding to an area that can accept input data for the data entry user interface. As also seen in this figure, the user interface of the application includes three edit controls 203-207, which are each bounded by a bounding box. Below each bounding box is a title 209-213, identifying the data that is to be entered into the associated edit control 203-207, respectively. Thus, the user interface for the application illustrated in FIG. 2A might be, for example, a form rendered on a computer requesting personal information from the user.

Figure 3:
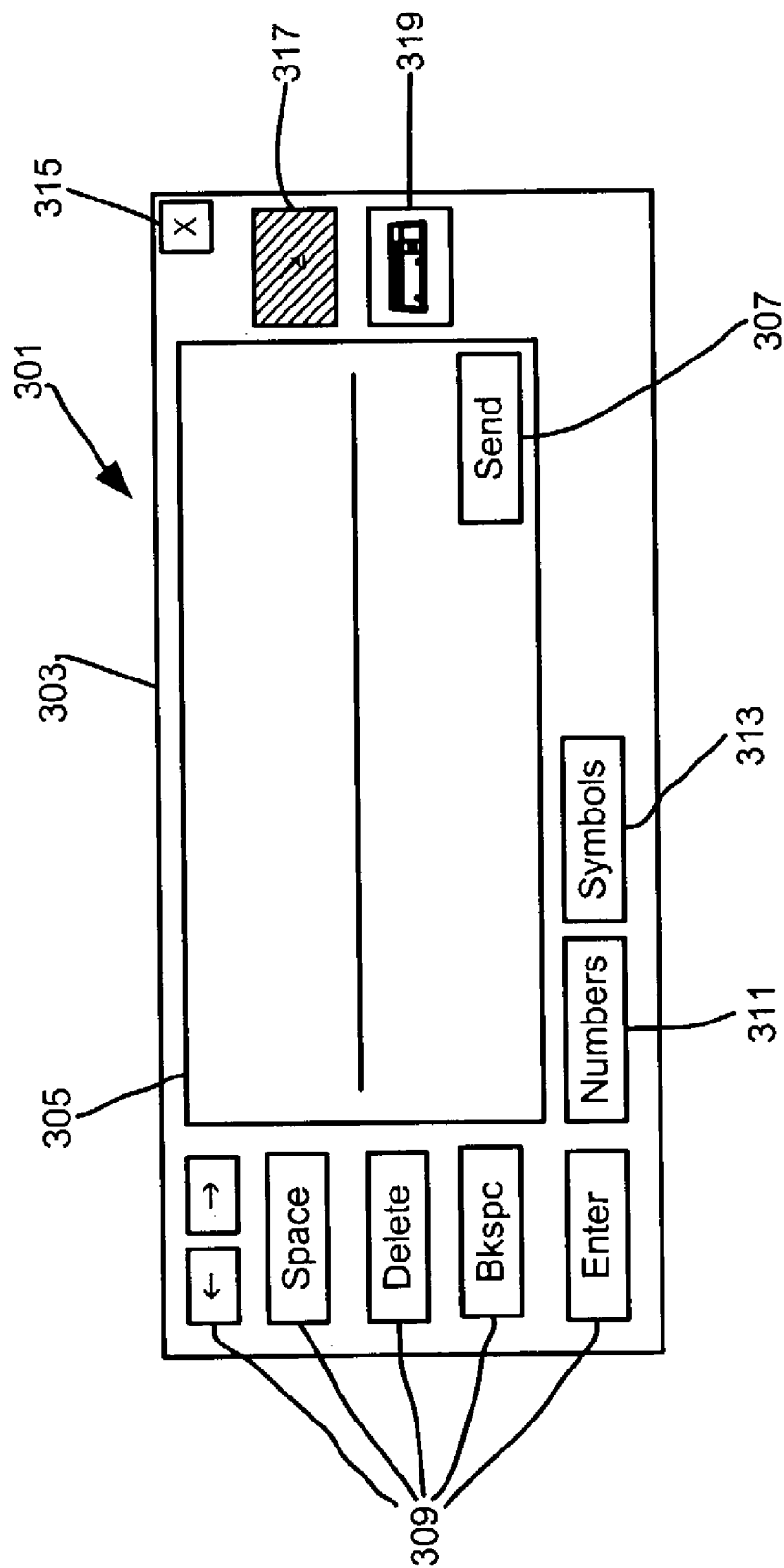
FIG. 3 illustrates a data input panel according to various embodiments of the invention.

FIG. 3 illustrates one type of data entry graphical user interface that might be employed to enter data into the edit controls 203-207 of the application illustrated in FIG. 2A. The data entry graphical user interface, referred to here as a data input panel 301, includes a boundary 303. Inside the boundary 303 is a writing surface 305. As will be appreciated by those of ordinary skill in the art, a user may write electronic ink onto the surface 305 using a suitable pointing device, such as a stylus. The ink then may be recognized as text. (With some data input panels according to various embodiments of the invention, a writing surface may only generate electronic ink in response to contact from a stylus.) With various embodiments of the invention, particular gestures made with the stylus may alternately be recognized as commands to perform some function. The data input panel 301 also includes a send button 307, a plurality of control buttons 309, and supplemental interface buttons 311 and 313.

After the user has written electronic ink onto the writing surface 305, the data input panel 301 will convert the electronic ink into text after a predetermined period. If, however, the user wishes to speed up the recognition process, the user may activate the send button 307 using a pointing device. Once text is recognized from the electronic ink, it typically is inserted into an application at an insertion point in a control. In addition to inserting recognized text at an insertion point, the user may insert non-character actions at the insertion point as well, using the control buttons 309. For example, using the control buttons 309, a user may move the insertion point forward or backward through existing text, delete, backspace, and create a carriage return.

As will be explained in more detail below, activation of the supplemental interface buttons 311 and 313 command the data input panel 301 to display supplemental soft keyboards containing number and symbols, respectively, while activating the close button 315 will close the data input panel 301. The data input panel 301 also includes surface selection buttons 317 and 319. As will also be discussed in detail below, the surface selection buttons allow a user to switch between data input surfaces displayed by the data input panel 301. In FIG. 3, the writing surface button 317 is activated, prompting the data input panel 301 to display the writing surface 305.

Figure 2B:
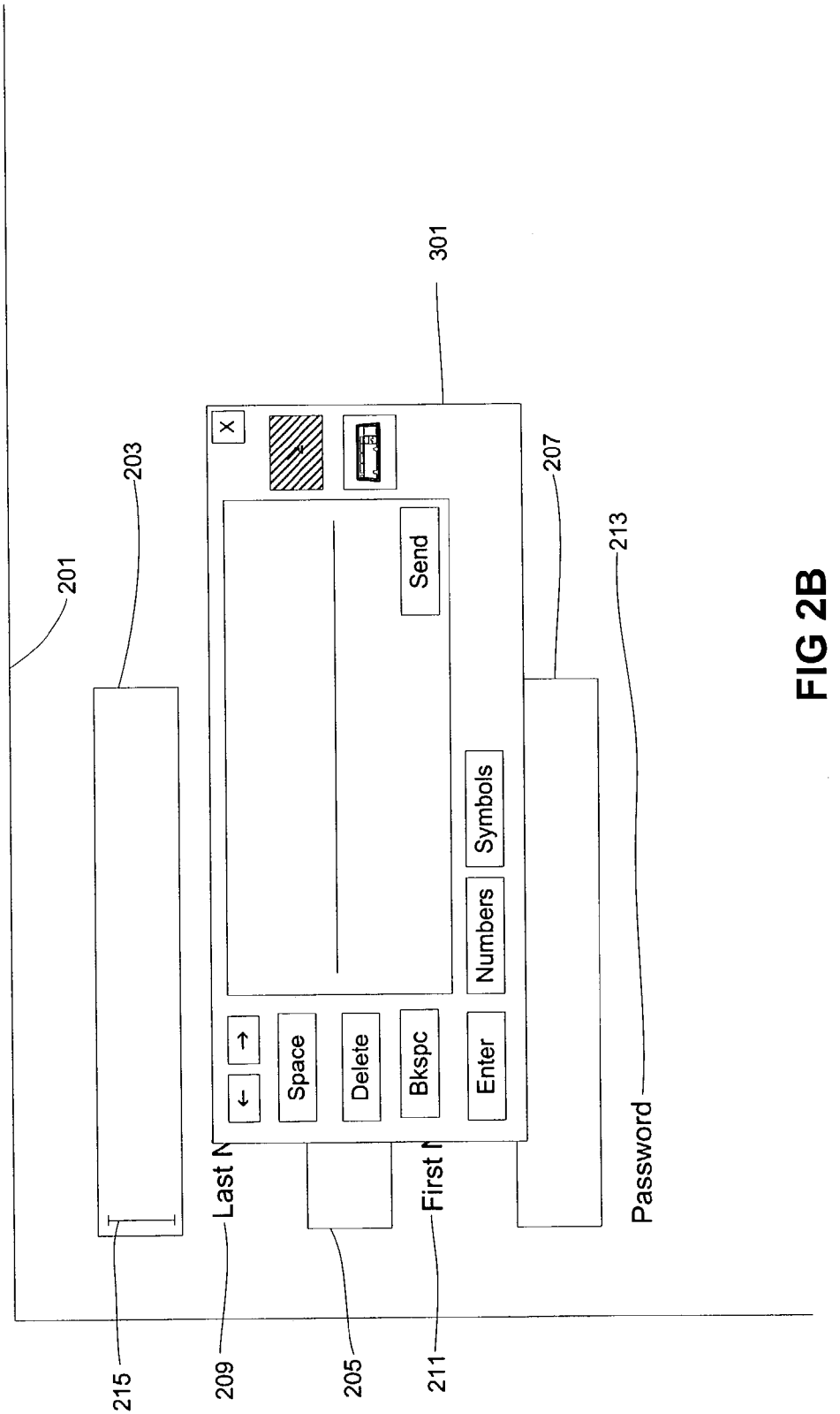
FIGS. 2B-2D illustrate the insertion of text into an edit control.

When the user wishes to insert data into an edit control, the user first establishes an insertion point in the edit control using, for example, a pointing device such as a stylus or mouse. Turning now to FIG. 2B, for example, a user wishing to insert data into the edit control 203 establishes an insertion point 215 within the boundaries of the edit control 203. Typically, placing an insertion point within an edit control causes the operating system of the computer to shift the input focus to that edit control. That is, the operating system recognizes that future data input by a user will be delivered to that edit control. In response to the edit control 203 receiving the input focus, the utility object according to various embodiments of the invention instructs a shared component to display the data input panel 301 for entering data into the edit control 203. The shared component encapsulates and instantiates a graphical user interface that may be shared among multiple utility objects. As will be discussed in detail below, the characteristics of the shared graphical user interface will vary depending upon the data provided by the object controlling the user interface.

With some embodiments of the invention, the utility object may instruct the shared component to display the data input panel 301 whenever the user places an insertion point into an edit control. With alternate embodiments of the invention, however, the utility object may instruct the shared component to display the data input panel 301 only in response to the user placing an insertion point with a stylus. By responding only to an insertion point created with a stylus pointing device, the object prevents the data input panel 301 from being displayed when the user is employing a different data entry tool, such as a keyboard or mouse. Thus, the data input panel 301 will be displayed only when needed to actually enter data into a control.

When the utility object determines that the edit control 203 is receiving input focus, the utility object may instruct the shared component to display the data input panel 301 at a specific location relative to the edit control 203. For example, the object can specify a vertical offset between the closest horizontal boundary edge of the data input panel 301 and the closest horizontal boundary edge of the edit control 203. Similarly, the object can specify a horizontal offset between the closest vertical boundary edge of the data input panel 301 and the closest vertical boundary edge of the edit control 203. With some embodiments in of the invention, the object may even specify a height and width of the data input panel 301, to ensure that it fits within the prescribed work space while remaining close to the relevant edit control.

In the illustrated embodiment, if space is available within the work space boundary 201, then the utility object instructs the shared component to display the data input panel 301 below and shifted toward the right of the boundary of the edit control 203. For example, the object may direct the shared component to position the upper boundary of the data input panel 301 the pixel equivalent of 0.25 inches below the lower boundary of the edit control blocks 203. Similarly, the object may direct the shared component to position the left vertical boundary of the data input panel 301 the pixel equivalent of ¹⁄₁₆ of an inch to the right of the left vertical boundary of the edit control 203.

This position arrangement is particularly convenient when the application is displaying a form with a variety of edit controls. By placing the data input panel 301 below and slightly shifted toward the right of the edit control 203, the data input panel 301 remains close to the edit control 203, but does not obscure the user's view of text entered into the edit control 203. This positioning also allows the user to view at least a portion of the edit control 205 directly below the edit control 203, so that the user does not forget to enter data into the edit control 203 as well. Additionally, the edit control 205 is partially visible so that the user can target the control using the stylus to move the input focus to edit control 205. Moreover, if the title 209 associated with a the edit control 203 is left justified, then the right-shifted position of the data input panel 301 will also allow the user to view at least the first letters of the title 209, and thus will assist the user in remembering what data should be entered into the edit control 203.

Figure 2C:
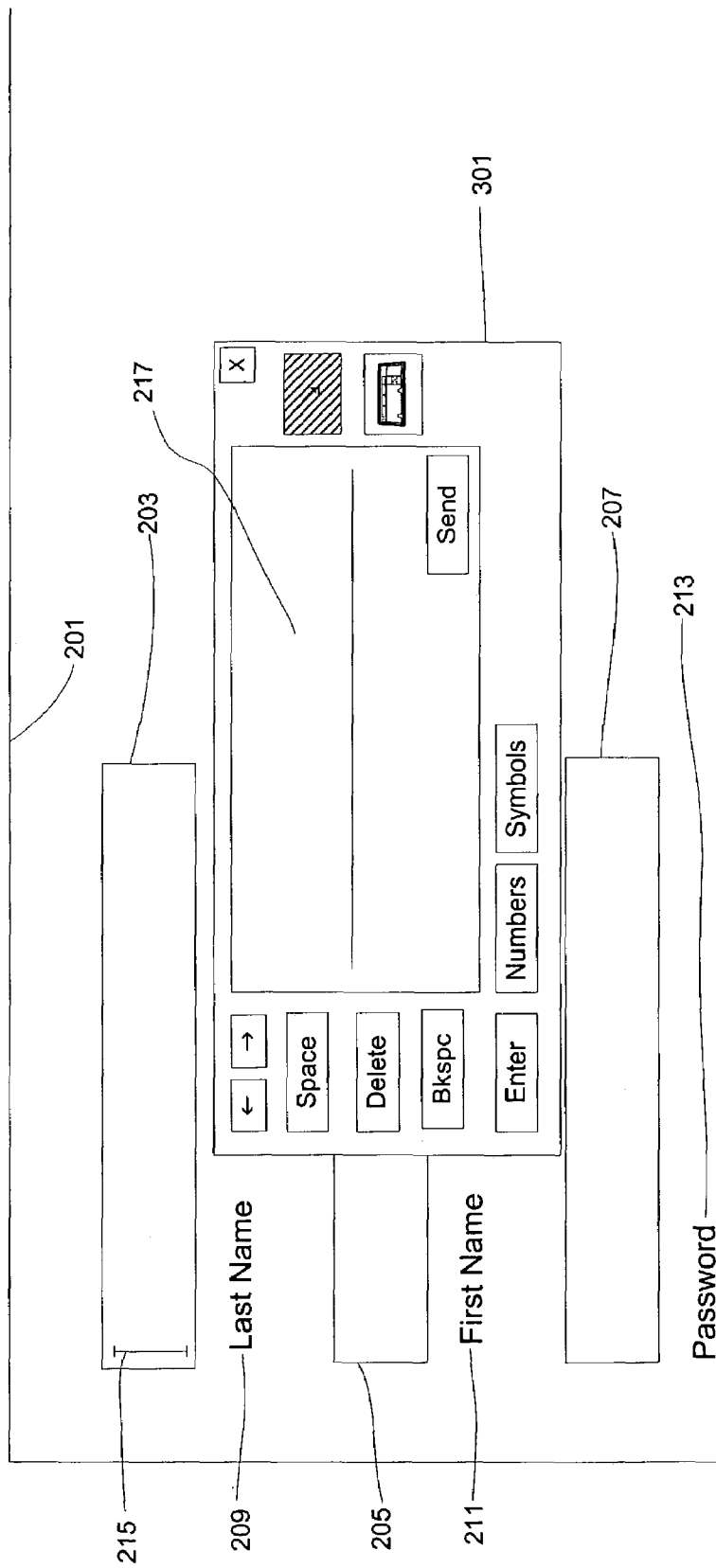
Figure 2D:
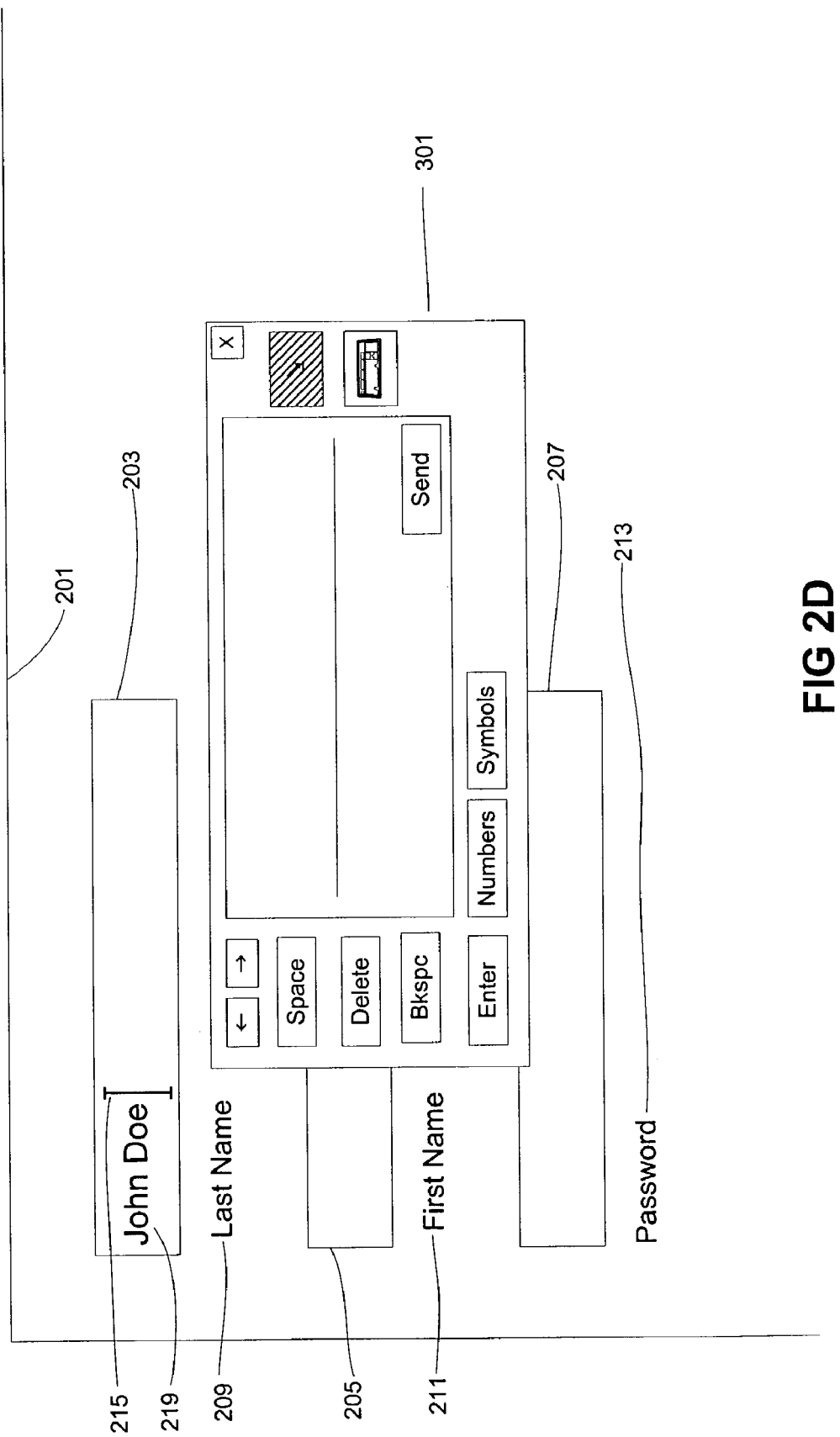

Once the data input panel 301 is displayed, the user can employ the writing surface of the data input panel 301 to enter text into the edit control 203. For example, as illustrated in FIG. 2C, the user might handwrite the name "John Doe" in electronic ink 217 onto the writing surface. After a predetermined amount of time, or if the user activates the send button 307, the data input panel 301 recognizes text from the ink 217. Then, as shown in FIG. 2D, the data input panel 301 inserts the recognized text 219 into the edit control 203.

Figure 4:
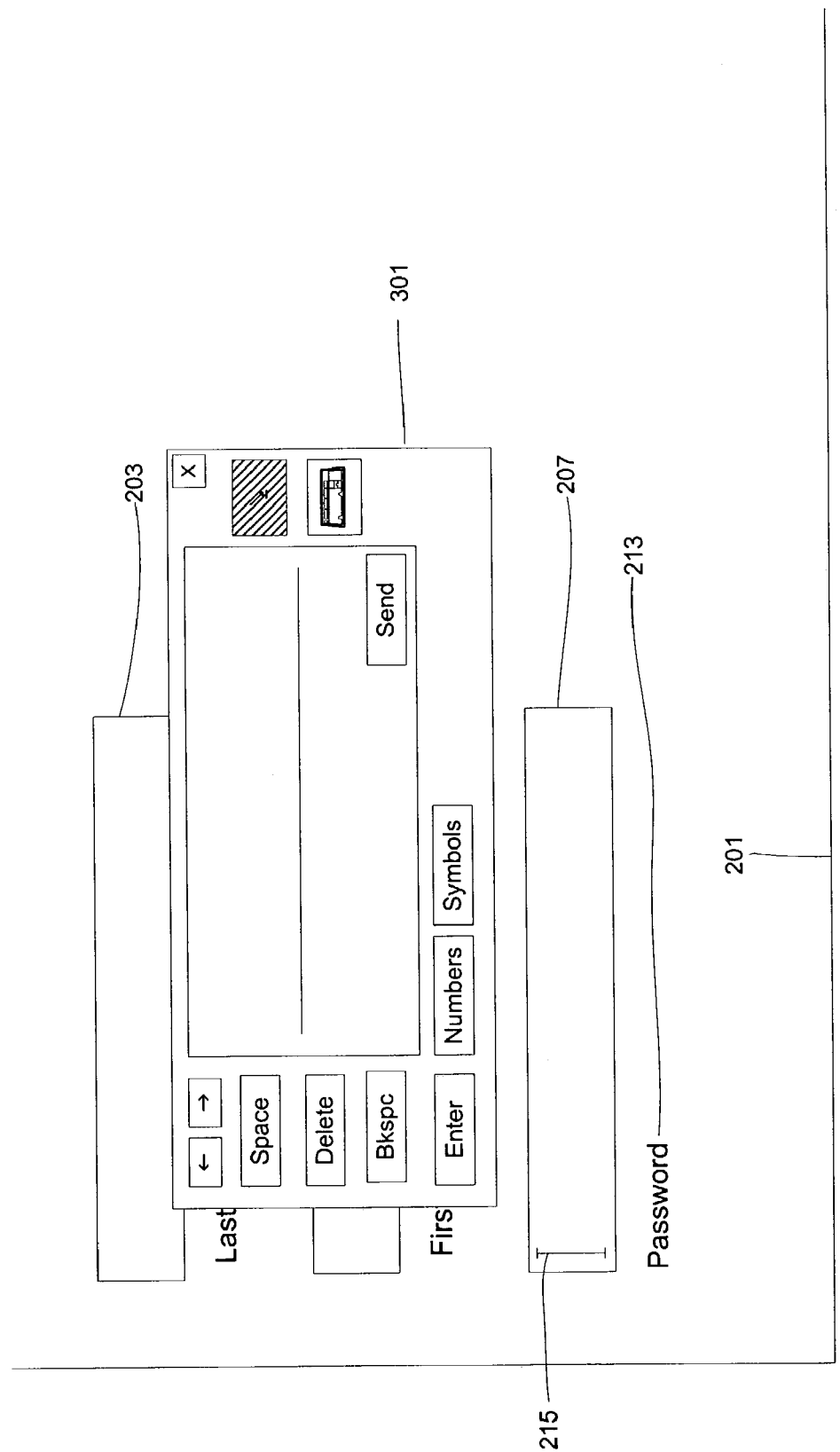
FIGS. 4-6 illustrate alternate positioning of a data input panel relative to the edit control windows according to an embodiment of the invention

With various embodiments of the invention, the object can even compensate for situations where the default position of the data input panel 301 cannot be used without obscuring the associated edit control. For example, as shown in FIG. 4, the data input panel 301 is being used to insert text into the edit control 207. Because the edit control 207 is just above the boundary 201 of the work space, the data input panel 301 cannot be inserted below the edit control 207. In this situation, the object may instruct the shared component to render the data input panel 301 at a position above and shifted toward the right of the edit control 207. More particularly, the object may provide the shared component with a negative vertical offset, thereby placing of these data input panel 301 above the edit control 207.

Figure 5:
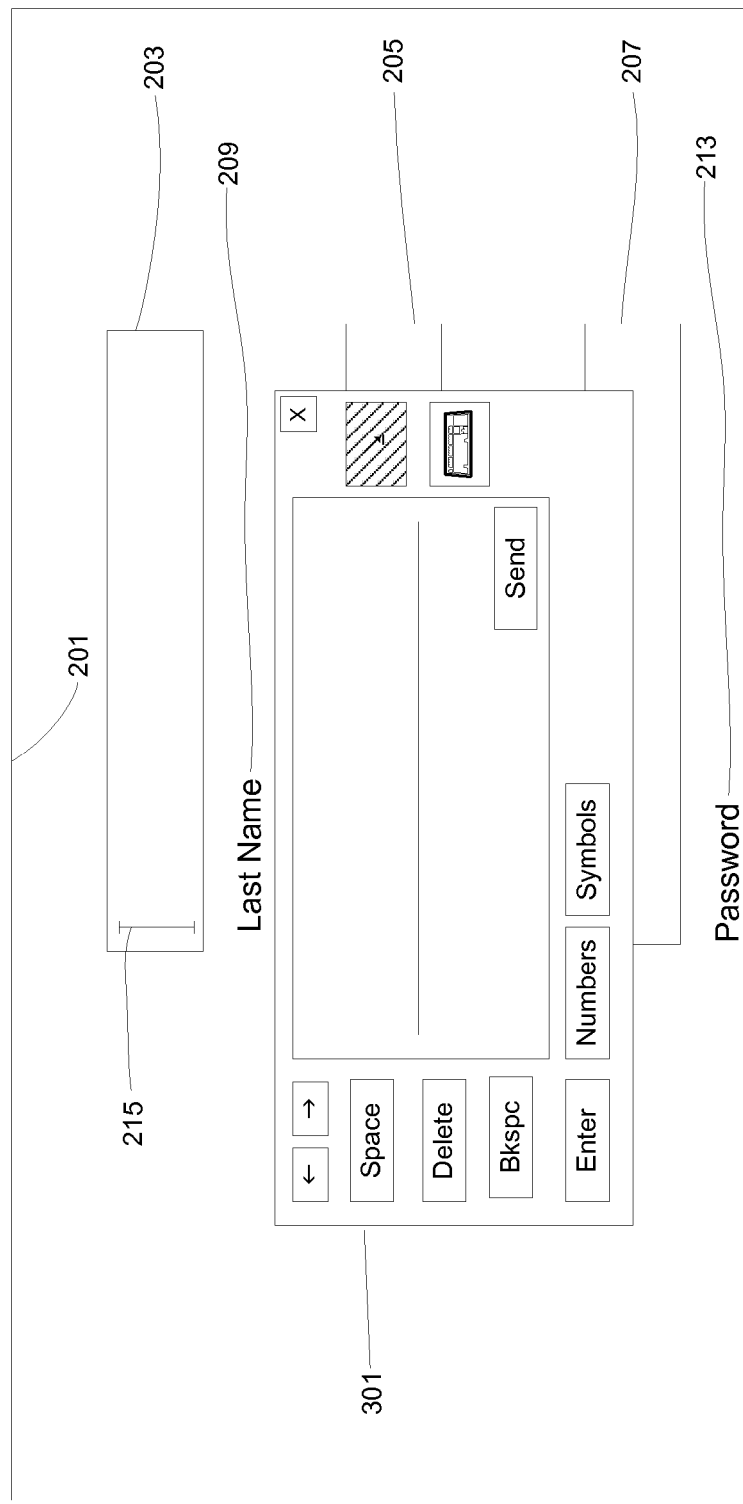
Figure 6:
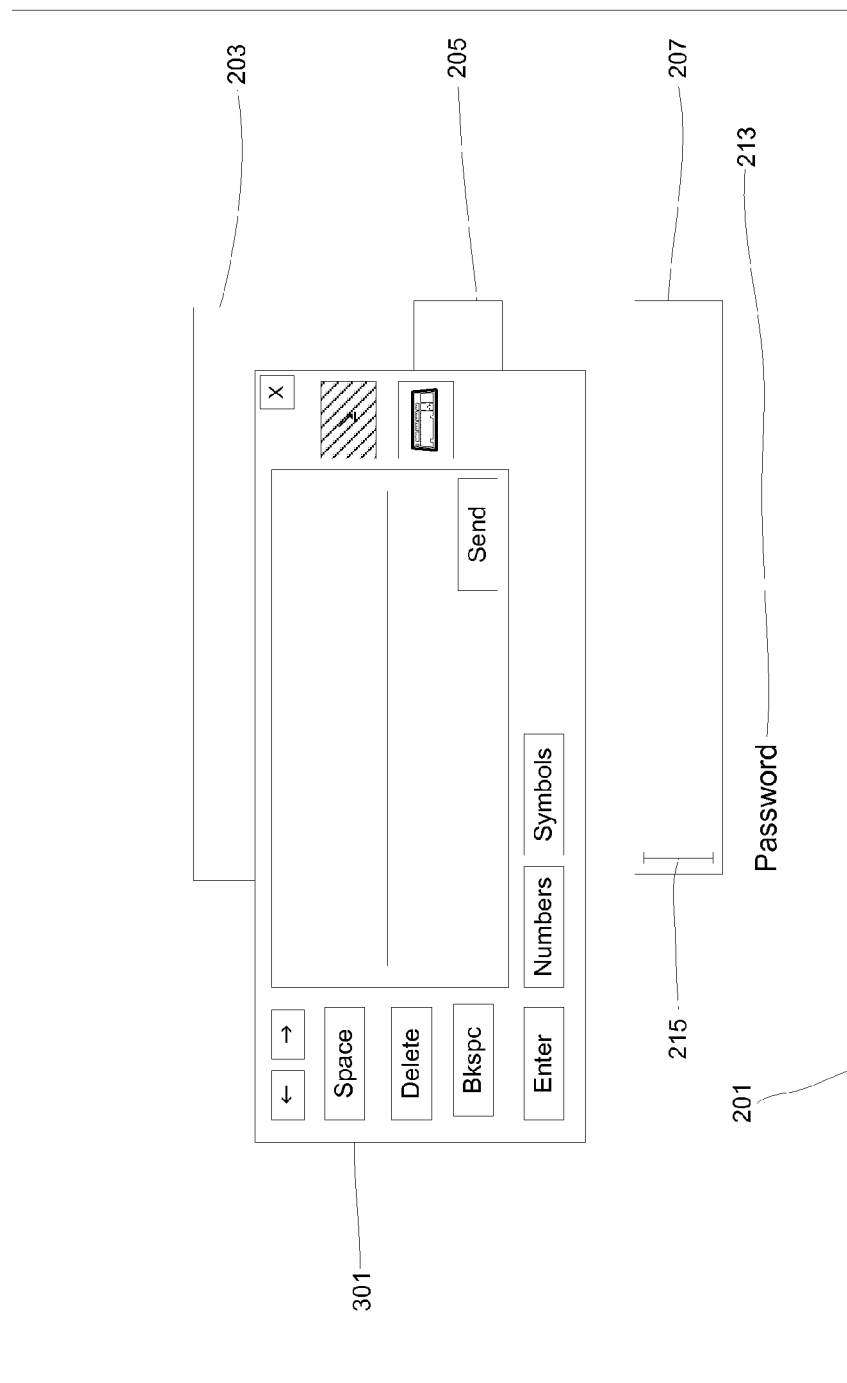

Similarly, if there is insufficient room to display the data input panel 301 shifted toward the right of an edit control, then the object may instruct the shared component to place the data input panel 301 shifted toward the left of the edit control. For example, as illustrated in FIG. 5, the edit control 203 is too close to the vertical portion of the work space boundary 201 to display the data input panel 301 shifted toward the right of the edit control 203. Instead, the object instructs the shared component to place the data input panel 301 shifted toward the left of the edit control 203. That is, the object provides the shared component with a negative horizontal offset value. Thus, the data input panel 301 will not completely obscure the underlying edit control 205. Also, if an application contains edit controls along the right-hand side of its user interface, then right-justified titles for these edit controls will still be partially visible to a user employing the data input panel 301 according to these embodiments of the invention. Likewise, if there is insufficient room to display the data input panel 301 below and shifted toward the left of the edit control, then the object may instruct the shared component to display the data input panel 301 above and shifted toward the left of the edit control, as illustrated in FIG. 6.

In some instances, a user may wish to employ a data input panel 301 in order to enter data into a multi-line edit control. According to various embodiments of the invention, the data input panel 301 may be positioned relative to a multi-line edit control in a similar fashion to its position relative to a single line edit control as described above. If the multi-line edit control is too large to allow the data input panel 301 to be positioned above or below the multi-line edit control, however, then the object may instruct the shared component to position the data input panel 301 within the edit control itself. For example, if the insertion point 215 is located in the upper half of the multi-line edit control (or, alternately, in the upper half of the work space), then the object may instruct the shared component to position the data input panel 301 at the lowermost portion of the multi-line edit control (or at the lowermost available position in the work space). Similarly, if the insertion point 215 is positioned in the lower half of the multi-line edit control (or, alternately, in the lower half of the work space), then the object may instruct the shared component to position the data input panel 301 at the uppermost portion of the multi-line edit control (or the uppermost available position in the work space). As will be appreciated by those of ordinary skill in the art, however, it is beneficial to minimize the movement of the data input panel 301 during use, in order to avoid confusing the user or disrupting the user's work flow. Accordingly, various embodiments of the invention will reposition the data input panel 301 only when the user relocates the insertion point 215 from the upper half of the multi-line edit control to the lower half of the multi-line edit control, or vice versa.

It should also be appreciated by those of ordinary skill in the art that, with various embodiments of the invention, the auto positioning features described above may be disregarded or modified. For example, a developer creating a software application to employ an object according to the invention may disable the auto positioning features, and instead provide alternate position information for data entry user interfaces invoked through the application. Thus, a developer may choose to always position the data input panel 301 directly above or directly below the associated control. Alternately, a developer may prefer a specific location for a data entry user interface when the user is inserting data into a particular control. With this arrangement, the object associated with that particular control may specify exact values for the position and size of the user interface.

With still other embodiments of the invention, the object can ensure that an associated data input panel 301 moves with an edit control. For example, some edit controls are contained within windows that a user can move by, for example, manipulating a pointing device. Using a method that will be described in more detail below, an application, working through an object, can direct a data input panel 301 to move with its associated edit control. With this method, the data input panel 301 is moved directly to a new location designated by the application. Of course, alternate methods may be employed that incrementally move the data input tablet 301, and thus continuously display movement of the data input panel 301 through the work space.

Appearance of the User Interface

In addition to specifying the size and position of a data entry graphical user interface, a utility object according to various embodiments of the invention may also specify the appearance of a data entry graphical user interface. Thus, a utility object according to various embodiments of the invention can determine which features the shared component will include in a displayed data input panel 301.

Returning now to FIG. 3, the data input panel 301 can provide two different data input surfaces, as previously noted. When the data input panel 301 displays the writing surface 305 as shown in that figure, the data input panel 301 generates electronic ink corresponding to the motion of a stylus across the writing surface 305. If, on the other hand, the data input panel 301 displays a keyboard surface, then the data input panel 301 will generate a character of text corresponding to each key activated on the soft keyboard. As previously noted, a user can toggle back and forth between these surfaces by activating the surface buttons 317 and 319. With various embodiments of the invention, however, the utility object can specify that a data input panel 301 initially display a particular surface when the input focus is shifted to a control.

For example, an application may include an edit control for receiving a random combination of numbers and letters, such as a password or product model number. With this type of data, the writing surface 305 may not be the most suitable surface for entering the data. Many handwriting recognizers have difficulty recognizing random characters. Further, many password edit controls do not accurately display their data, but instead display only a single character, such as "*", to prevent a bystander from inadvertently viewing a user's password. Thus, if the user's handwriting is being inaccurately recognized, the user cannot even view the recognition results to determine which character or characters are being incorrectly recognized. With various embodiments of the invention, an object associated with this type of edit control may instruct the shared component to initially display the keyboard surface, as it provides the user with a more reliable technique for entering random numbers and letters.

Figure 7:
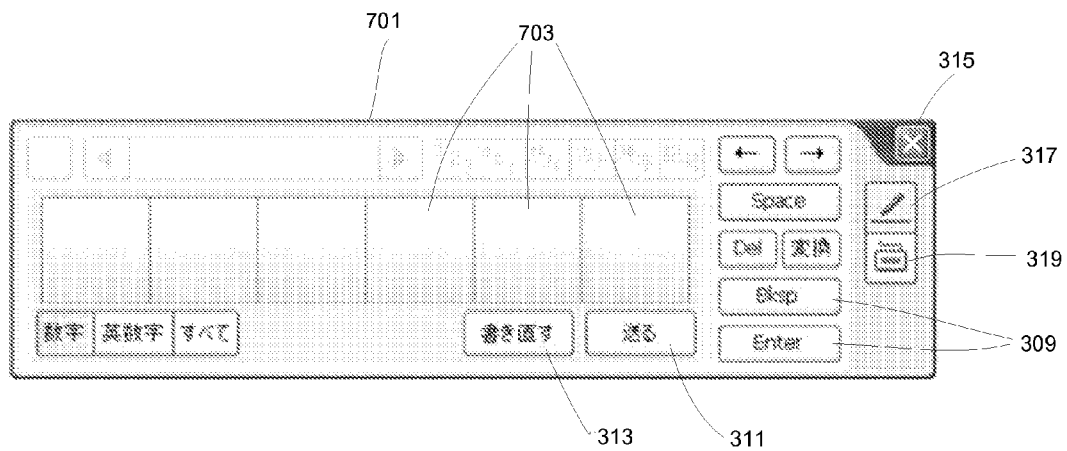
FIG. 7 illustrates a data input panel with an Asian language writing surface.

In addition to specifying the initial display of the writing surface 305 or the keyboard surface, a utility object may specify the initial or permanent display of any surface that can be displayed by the shared component. For example, FIG. 7 illustrates a data input panel 701 for use by Asian language users. Instead of the writing surface 305 with a single area, the writing surface of this data input panel 701 simultaneously displays multiple writing areas 703, so that a user can write a single Asian-language character in each area 703. Thus, if an edit control is configured to receive data in the form of Asian language characters, the utility object associated with that edit control can specify that the shared component initially display the Asian language data input panel 701. It should be noted that the Asian language writing surface can be included in data input panel 301 in addition to the Latin language writing surface 305. Thus, with some embodiments of the invention, a user may toggle between the Asian language writing surface, the Latin language writing surface 305, and the keyboard surface.

Of course, still other embodiments may employ any number of different specialized surfaces. For example, an edit control in a browser configured to receive universal resource locator addresses may specify the display of a soft keyboard containing keys for the character strings "www.," ".com," ".net," ".org" and ".gov." Likewise, a utility object can specify the display of a surface having partitioned writing areas for Latin language users in order to, for example, assist the data input panel 301 in better recognizing random characters in a password or part model number. Also, a utility object can specify that a user interface include a surface that collects electronic ink without converting the electronic ink into text. This type of surface may be useful when, for example, capturing a user's original signature.

Invocation of the Data User Interface

In addition to determining the appearance or other properties of a user interface such as a data entry user interface, the utility object according to various embodiments of the invention may also be employed to control how a user interface is invoked. For example, with some embodiments of the invention, based upon status information from the application, a utility object may determine whether the stylus or pen is hovering within a bounding area for a control associated with the utility object. In response, the utility object may instruct the shared component to display or hide the data entry user interface automatically, according to whether the pen is hovering inside or outside of the bounding area. This bounding area could be contiguous with the exact boundary of the control, or could alternately cover a larger area such that the pen only need come close to the visible control boundary.

Still further, as the pen (or other pointing device) moves into range of the control containing the insertion point, the utility object may instruct the shared component to display the data entry user interface immediately, or alternately, after a small delay. A delay may allow a user to drag the pen (or other pointing device) through or over the control associated with the utility object when targeting other adjacent controls, so that the data entry user interface is only displayed when the user explicitly indicates a desire to access the data entry user interface by momentarily holding the pen inside or above the control associated with the utility object. With alternate embodiments of the invention, the utility object may instruct the shared component to display a data entry user interface only when a pen is in range of the entire display area, such that the data entry user interface is only visible when the pen is in range of the entire screen.

According to still other embodiments of the invention, the utility object may not have the data entry user interface invoked directly. Instead, the utility object may instead activate a target for instantiating the data entry user interface. More particularly, the shared component may be configured to create a target for invoking the data entry user interface. Alternately, another component, such as an application programming interface, may be used to create a target for invoking the data entry user interface. With this arrangement, the utility object may instruct the shared component (or other applicable component) to create a target for invoking the data entry user interface when, for example, the user intends to enter data into certain types of controls associated with the utility object. Thus, by summoning a target, the utility object may allow the user to easily invoke the data entry user interface when desired, without having the data entry user interface continuously displayed.

Further, the utility object (or the application hosting the utility object) may monitor event messages relating to the location of a pen or stylus (or other suitable pointing device) to determine when the pen or stylus (or other pointing device) is moved over or, with some embodiments, proximal to the data entry user interface and display target. In response, the utility object may instruct the shared component (or other appropriate component) to display the data entry user interface only while the pen (or other pointing device) is positioned over or proximal to the target. With some embodiments of the invention, for example, the data entry user interface display target may take the form of a rectangle, circle, or any other geometric shape, and may be positioned above, below, left, right, and/or overlapping the control containing the insertion point. Again, the target may be displayed immediately or after a delay, and then the data entry user interface may be displayed immediately or after a delay.

Other Features of the User Interface

It should be noted that the data entry user interfaces employed by the various embodiments of the invention may implemented from any desired source. For example, different surfaces for a user interface may be provided by a shared component that renders a user interface in response to instruction from a utility object. Alternately, the utility object may provide one or more surfaces to the shared component. Still further, an application may provide one or more surfaces to a utility object, which can then provide the surfaces to the shared component. With some embodiments of the invention, the shared component may be an executable component, that instantiates the user interface itself. The shared component could alternatively be a non-executable component responsible for sharing data panel state information among multiple utility objects. Still further, some embodiments of the invention may omit a shared component altogether. With these embodiments, the utility object may render the data entry graphical user interface itself.

Figure 8:
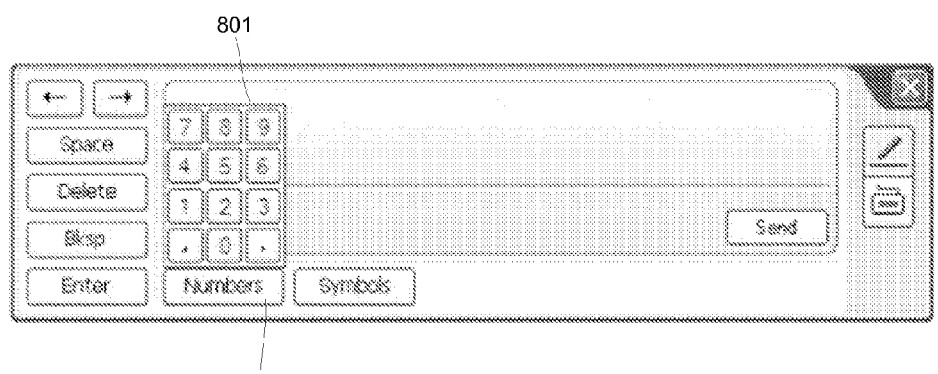
FIG. 8 illustrates a data input panel with a supplemental numbers keypad.
Figure 9:
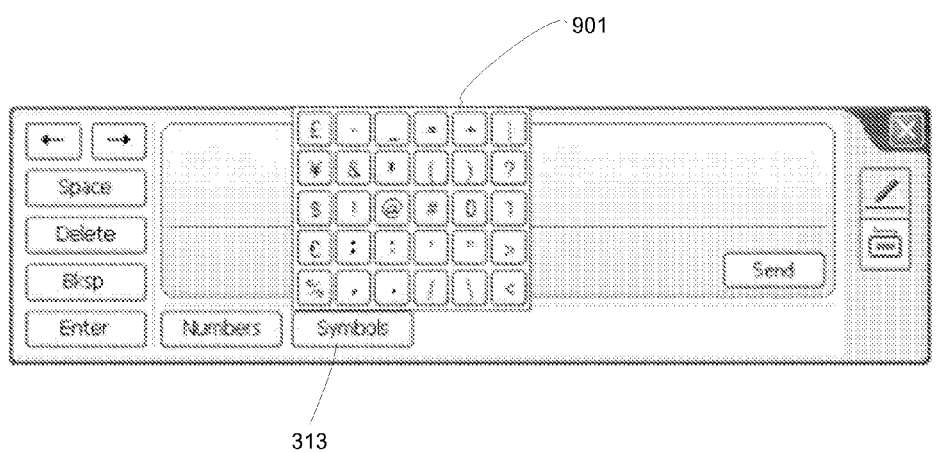
FIG. 9 illustrates a data input panel with a supplemental symbols keypad.

In addition to specifying the display of interface surfaces, with various embodiments of the invention the utility object may specify that the data entry user interface initially or permanently display any feature. For example, the data input panel 301 contains supplemental keyboard buttons 311 and 313. When the supplemental keyboard button 311 is activated, the data input panel 301 displays a supplemental keyboard 801 containing numbers 0-9, the "," character and the "." character, as shown in FIG. 8. Similarly, when the supplemental keyboard button 317 is activated, the data input panel 301 displays a supplemental symbol keyboard 901 that contains keys for a variety of symbols, as shown in FIG. 9. With various embodiments of the invention, a utility object may specify that a data input panel 301 be capable of displaying or not displaying either of these buttons, or any additional supplemental display that might be convenient to a user.

Figure 10:
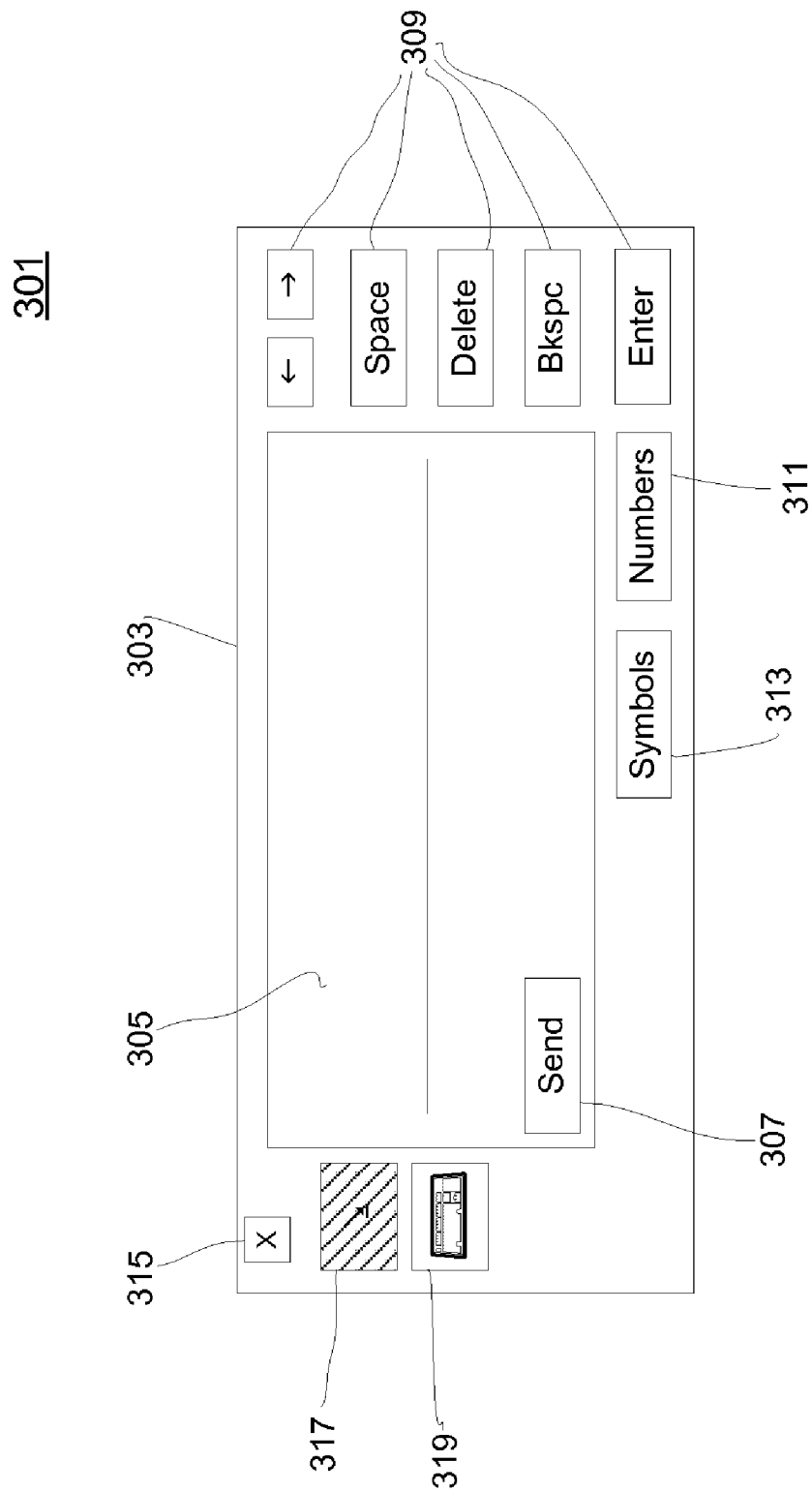
FIG. 10 illustrates a text input panel with reversed orientation.

Further, a utility object according to the invention may simply define the arrangement of components within a data entry user interface. For example, the features of the data input panel 301 shown in FIG. 10 are reversed from those in the data input panel 301 shown in FIG. 3. Typically, this arrangement is based upon a user's preference in writing with the right hand or the left hand. This arrangement may also be specified by a utility object, however.

It should be noted that, with some embodiments of the invention, the utility object simply identifies the characteristics of a data entry user interface to the shared component. That is, the object provides predetermined values to the shared component, and the shared component then renders a previously stored user interface according based upon those characteristics. Alternately, the utility object may provide a portion of or the entire interface to the executable component for display to a user, as previously noted. It should also be noted that a utility object according to various embodiments of the invention may not be instantiated separately from its associated control. Instead, an object may be embedded into a control.

Features and Operation of a Utility Object

Overview

While the overall operation of a utility object according to the invention was described above, a more detailed discussion of the characteristics of a utility object according to one or more particular embodiments of the invention will now be provided. A utility object according to some embodiments of the invention includes properties, methods and events. The properties define the characteristics of a data entry user interface controlled by the object, as noted above. Methods allow an application to alter the characteristics of a data entry user interface in response to, for example, actions by a user. Events are then the occurrence of specific actions noted by the object, to which the object may respond.

Properties

A utility object according to various embodiments of the invention may include an AttachedEditWindow property, a Busy property, and a Factoid property. The AttachedEditWindow property identifies the window handle of the edit control box to which the data input panel is attached, thereby ensuring that data from the data input panel is not inadvertently sent to the incorrect edit control. The Busy property, which can be read by an application using the object, identifies whether or not an associated data input panel is currently being inked or recognizing ink. The Factoid property then identifies a factoid, or set of heuristics, that will bias the handwriting recognition of the data input panel to improve its accuracy for a particular control. For example, a factoid associated with an control for receiving a user's age may bias the data input panel to recognize input electronic ink as numbers rather than letters.

The utility object may also include a Height property, a Width property, a HorizontalOffset property, and a VerticalOffset property. As noted above, the HorizontalOffset and VerticalOffset properties can be set by an application to define the position of the data input panel relative to an edit control. The default value of the HorizontalOffset property may be the pixel equivalent of 1/16 of an inch, while the default value of the VerticalOffset property may be the pixel equivalent of 0.25 inches. Each of these properties may be both read and written by an application. The Height property then provides an application with the height of the text panel user interface. With various embodiments of the invention, the default value of the Height property may be, for example, 157 pixels for a display with 96 dpi, 196.25 pixels for a display with 120 dpi, and 217.51 pixels for a display with 133 dpi, in order to maintain a consistent apparent size of the panel for a variety of display resolutions. Similarly, the Width property then provides an application with the width of the data input panel. With some embodiments of the invention, the default value of the Width property is 570 pixels for a display with 96 dpi, 712.5 pixels for a display with 120 dpi, and 789.7 pixels for a display with 133 dpi, in order to maintain a consistent apparent size of the panel for a variety of display resolutions. While some embodiments of the invention may not allow an application to change the Height or Width properties, still other embodiments of the invention may alternately allow an application to modify one or both properties.

The utility object may further include a Left property, which provides an application with the horizontal location of the left edge of the data input panel, and a Top property that provides an application with the vertical location of the top edge of the data input panel. The utility object may also include a Visible property, which retrieves or sets the visible state of the input panel. Thus, if an application wants to show or hide a data input panel to be displayed, it can change the value of the Visible property. Typically, the default value of this property will not show a data input panel, and will change only when a user shifts focus to its associated edit control by employing the stylus to place an insertion point in that edit control, but the Visible property allows an application to explicitly control whether a panel is visible, independently of whether the user has changed the input focus to the edit control by placing an insertion point inside the edit control with a pen. This default value can also be used to prevent multiple data input panels from being simultaneously displayed. With alternate embodiments of the invention, however, utility objects may allow multiple data input panels to be simultaneously displayed.

In addition to the properties listed above, a utility object may also have a DefaultPanel property and a CurrentPanel property. The DefaultPanel property determines which surface will be displayed in the data input panel by default, while the CurrentPanel property determines which surface is currently displayed in the data input panel. While there are a variety of panel values that may be employed for specialized panels, with the illustrated embodiment of the invention (having a keyboard surface and a writing pad surface) there are four possible panel values.

The first panel value, the Default value, can only be given to the DefaultPanel property and specifies that the data input panel will initially start with the default handwriting surface for the appropriate input language, and then keep any surface selected by a user for the remaining lifetime of the object instance. The second panel value, the Inactive value, can only be assigned to the CurrentPanel property by the object itself and read by an application. This value indicates that the data input panel is unavailable, which may occur if a control associated with another data input panel currently has focus. The third panel value, the Handwriting value, can be assigned to and read from both the CurrentPanel Property and the DefaultPanel property. This panel value forces the shared component to display the handwriting surface for the appropriate input language when the data input panel is displayed. Similarly, the fourth panel value, the Keyboard value, can be assigned to and read from both the CurrentPanel Property and the DefaultPanel property. The Keyboard panel value forces the shared component to display the keyboard surface for the appropriate input language when the data input panel is displayed.

In addition to the properties listed above, it should be appreciated that an object according to various embodiments of the invention may include any desired property for establishing the characteristics of a data entry graphical user interface. For example, an object may contain a property specifying one or more recognition context characteristics for a user interface, such as a particular recognition dictionary, factoid heuristics for biasing recognition of input handwriting, the use of a specific recognition engine, either generally or for recognizing text being inserted into a specific control, or instructions for the user interface to perform background recognition of input handwriting without waiting for a user to stop entering new handwriting. Further, an object may contain a property that causes a user interface to use an assigned recognition timeout value for returning recognized text, a particular electronic ink thickness or color, or to highlight desired keys on a keyboard surface. Properties or methods for an object may further allow an input panel to insert ink directly into a control, or to access ink that has already been inserted into a control. An object may also contain a property that forces a data input panel to display multiple lines on a writing surface, determines whether a user may voluntarily close the data input panel, or inform an application as to the status of a data input panel (i.e., if the panel is in use, if the panel contains electronic ink, etc.).

It should also be noted that one or more properties of the type described above may be embedded in a control itself. For example, an application can designate that data entered onto a rich edit control for receiving social security numbers be recognized using a factoid that biases recognition of handwriting toward the recognition of numbers over letters. For various embodiments of the invention, any such property may be embedded into a specific control rather than used by an associated object. Also, an application can include a control that internally employs a utility object, which may or may not expose the object's application programming interface on its own application programming interface. This type of control, however, will still display the input panel when it received input focus, even though it does employ a separate utility object.

Methods

In addition to the properties listed above, a utility object according to various embodiments of the invention may perform several methods. For example, a utility object may perform the CommitPendingInput method, which requests that the shared component immediately perform handwriting recognition on any pending handwriting, and then send the recognition result to the attached edit control. Because the shared component will typically perform handwriting recognition automatically after some preset timeout period, the CommitPendingInput method may be used by the application to force the input to be recognized and submitted directly. The object may also utilize this method itself when the object detects that the user is moving input focus away from its attached edit control, or when the object detects that the application is being shut down.

The utility object may also include the AutoShow method, which sets or retrieves a Boolean value specifying whether the data input panel appears when a control's input focus is set using a stylus. Thus, the AutoShow method can be used to disable activation of the data input panel when a user sets the focus to the attached control using a pen or stylus. That is, the AutoShow method can be employed to ensure that the data input panel only become visible when the application changes the value of the Visible property. A utility may also perform a MoveTo method, which sets the position of the data input panel to a static screen position, and the Refresh method, which forces the shared component to update the data input panel settings which are also read at initialization Also, if the application is being employed with an operating system that provides a text service framework, such as the Microsoft WINDOWS® brand XP Tablet PC Edition operating system, then the utility object may perform the EnableTextServicesFramework method when associated with a rich edit control or an ink edit control (that is, with an edit control that supports the text service framework). As known to those of ordinary skill in the art, a text services framework can associate various metadata with text. For example, if the text were recognized from handwriting or speech, then that text will have alternate recognition selections. If an application supports a text services framework, then when the 'application receives text, it will also receive and maintain any metadata associated with that text. Accordingly, performing this method instructs the shared component to start the applicable text services framework (such as the Common Text Framework used with Microsoft WINDOWS® brand XP Tablet PC Edition operating system) on the attached control.

As well as providing correction functionality, the text services framework can also be used to ensure that recognized input data is accurately matched with its destination edit control. More particularly, when a rich edit control or ink edit control invokes the Common Text Framework, the Common Text Framework creates metadata for subsequently recognized text that associates the recognized text with the control. Thus, even after the input focus has shifted from the control, the Common Text Framework can match recognized text with the control and ensure that the recognized text is inserted into the control.

It should be noted, however, that with the Common Text Framework, the object must send the rich edit control a message instructing the rich edit control to request an OLE interface to the Common Text Framework (that is, the rich edit control must ask for a pointer to a COM interface to access COM features). With some embodiments of the invention, this message is performed with the EnableTextServicesFramework method rather than being performed automatically, because if the object is not attached to a rich edit control, then the message has no meaning, and may even trigger unwanted results. With alternate embodiments of the invention, however, a utility object could inspect a class name of a control or window, and then automatically send the messages based upon the identified class name.

In addition to the methods described above, other methods can be additionally or alternately employed with various embodiments of the invention. Thus, if the application is being executed by an operating system that provides its own data input panel, a utility object may also be able to perform various methods relating to that system data input panel. For example, an object could call methods that determine the current visibility of the system data input panel, set the visibility state of the system data input panel, and control how the data input panel associated with the object interacts with the system data input panel.

Events

In addition to the methods and properties listed above, a utility object according to various embodiments of the invention may monitor for various events. For example, a utility object may monitor for InputFailed events, which occur when input focus changes before object was able to insert user input into its attached control. As will be discussed in detail below, the InputFailed events may be used to alert an application that recognized text was not properly delivered to an edit control. The object may also monitor for PanelChanged events, which occur when the surface of the data input panel has changes, and PanelMoving events, which occur when the data input panel is moving. It should also be noted that an application can override the left and top coordinate of the user interface by changing the passed-in values during the PanelMoving event (which is fired when the panel re-calculates its position on the screen, as well as when the application calls the MoveTo method). The utility object may also monitor for VisibleChanged events, which occur when the data input panel changes from showing to hidden and vice versa. Additionally, an object according to various embodiments of the invention may include an event that fires before ink strokes are recognized and converted to text. This event allows an application to capture the ink before it is recognized, so that the application may, for example, receive the ink in its original form or provide the ink to another recognition engine Use with Alternate Application Programming Interfaces While some embodiments of the invention has been generally described with reference to the Microsoft WINDOWS® brand XP Tablet PC Edition operating system, it should be appreciated that various embodiments of the invention may be used in a variety of software environments. In particular, utility objects according to the invention may be used in a COM environment. In a COM environment, the utility object can be associated with a Dynamic Linked Library associated with a GUID (that is, the shared component that creates the data entry user interface). When an application is instantiated, the Microsoft WINDOWS® brand XP Tablet PC Edition operating system, for example, looks in the registry to find the Dynamic Linked Library associated with that application. The operating system then calls the functions that are included in that Dynamic Linked Library, which in turn summons the shared component through the COM interface. Also, in the COM environment, for example, the object may attach to a control through a window handle. Similarly, utility objects according to the invention may be used in a .NET environment, by tying the appearance of the data input panel to a class that wraps an automation object. As previously noted, however, a utility object according to various embodiments of the invention may be employed in any suitable operating environment.

Operation of the Object with an Application

Instantiation of the Object by an Application

Figure 11A:
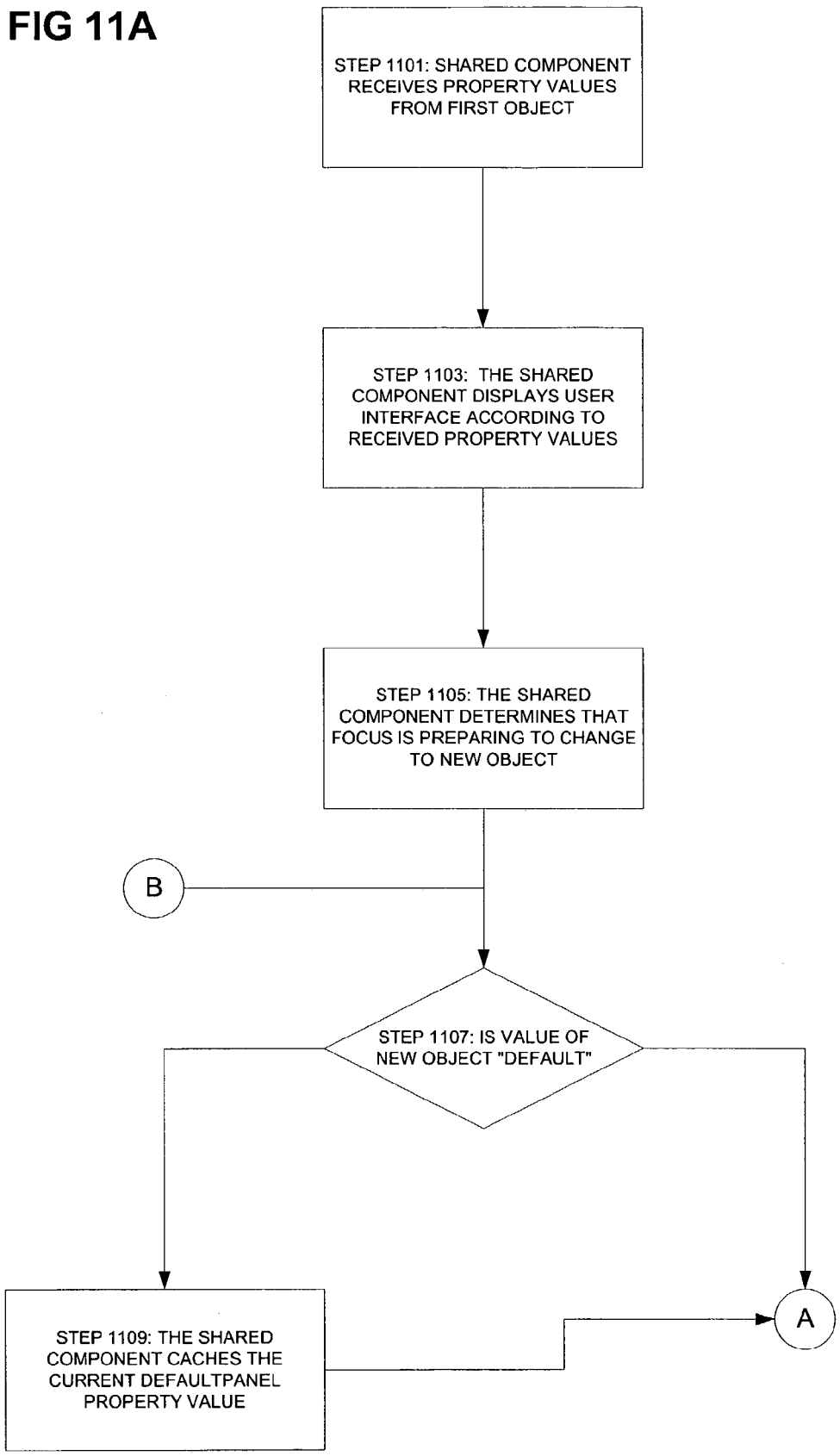
FIG. 11 illustrates a method for process panel type values according to various embodiments of the invention.
Figure 11B:
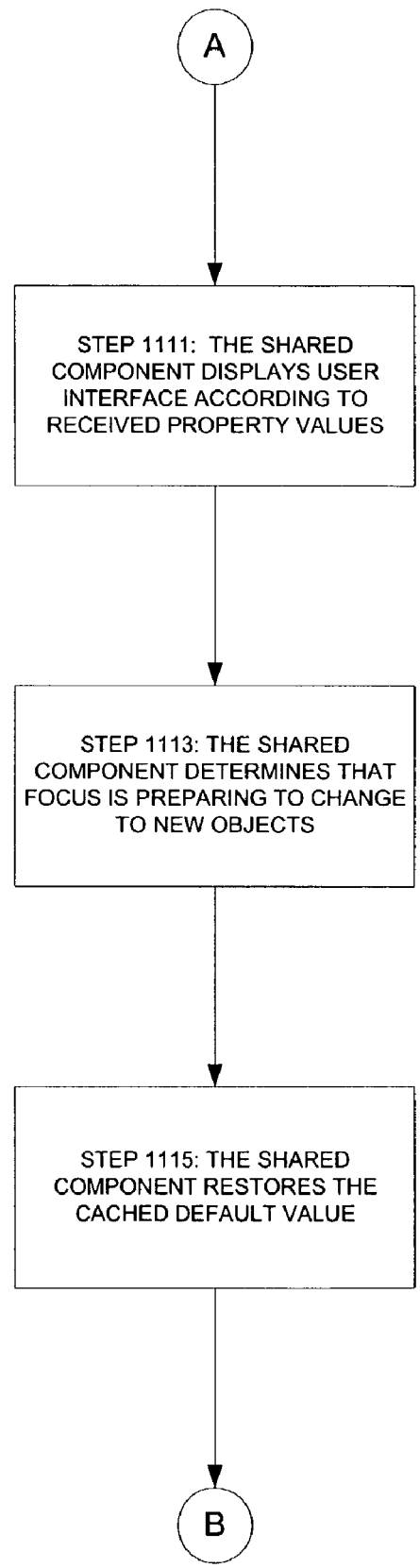
Figure 12:
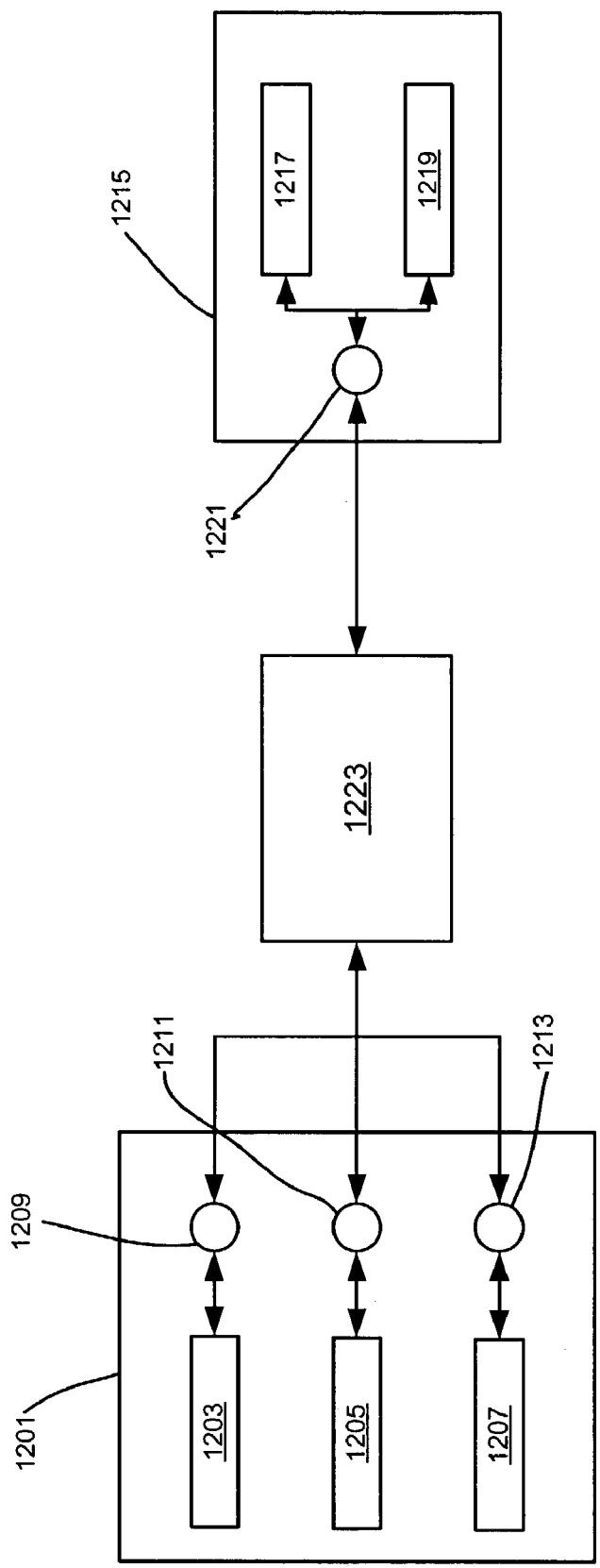
FIG. 12 illustrates sharing of a shared component among different utility objects associated with controls according to various embodiments of the invention.

The operation of a utility object according to various embodiments of the invention will now be described with reference to FIGS. 11A, 11B and 12. As shown in the example configuration illustrated by FIG. 12, an application 1201 contains three controls 1203, 1205 and 1207. A utility object 1209 is attached to the control 1203. Similarly, a utility object 1211 is attached to the control 1205, while another utility object 1213 is attached to the control 1207. A second application 1215 includes a control 1217 and a control 1219. A utility object according to various embodiments of the invention is attached to both the control 1217 and the control 1219. Each of the utility objects 1209, 1211, 1213, and 1221 interface with the shared component 1223. That is, each of the objects 1209, 1211, 1213, and 1221 share the use of a single shared component 1223. As described in detail above, the shared component 1223 creates a data entry graphical user interface based upon property values provided by the utility objects 1209, 1211, 1213, and 1221. In the illustrated embodiment, the shared component 1223 creates a data input panel like that shown in FIG. 3, but it should be appreciated that, with alternate embodiments of the invention, the shared component can create other types of user interfaces.

Referring now to FIG. 11, when the user seeks to enter data into the control 1203, the object 1209 determines that the control 1203 is receiving input focus from the operating system. In response, the shared component 1223 receives a summons from the object 1209 in step 1101, which includes the property values defined by the object 1209. Using these values, the shared component 1223 displays a data input panel through which the user can enter data into the control 1203 in step 1103. In the illustrated embodiment, the value of the DefaultPanel property for the object 1209 is Default which, in this example, is initially the writing surface. Thus, the shared component 1223 displays a data input panel including the writing surface 305.

It should be noted that, when the shared component 1223 determines that the input focus has shifted to a new control, the shared component 1223 stores the identification of that control. Using this identification, the shared component 1223 can associate electronic ink received while that control has input focus with the control. If the input focus subsequently shifts to a new control while electronic ink associated with a previous control is still being recognized, the shared component 1223 determines that the recognized ink cannot be delivered to the proper control. (As previously noted, however, if the Common Text Framework is invoked on the attached control, the data input panel is able to send the results of handwriting to the control even after focus has left the control.) Accordingly, the shared component 1223 issues an InputFailed event to the application, along with the recognized text. This will allow the application to route the recognized text back to the proper control.

When the user wants to enter data into another control, the user shifts the input focus from the control 1203 to the desired control. For example, if the user wishes to enter data into control 1217, the user changes focus to this control by tapping a stylus within the boundary of control 1217 to place an insertion point. In step 1105, the shared component 1223 determines that focus is about to change from the control 1203 to the control 1217. In step 1107, the shared component 1223 determines whether the value of the DefaultPanel property in the object associated with the control that is receiving focus (that is, the value of the DefaultPanel property of the object 1221) is also Default. If the value of the DefaultPanel property in the upcoming object is not Default, then the shared component 1223 caches the current state of the data input panel. In this example, the value of the DefaultPanel property of the object 1221 is instead Keyboard. Accordingly, in step 1109, the shared component 1223 caches the current value of the DefaultPanel property. If, however, the value of the DefaultPanel property of the object 1221 was Default as well, then no action is taken.

When the object 1221 gains control of the shared component 1223, it forces the shared component 1223 to provide the user with a data input panel that initially displays the keyboard surface. Later, when the user wishes to change the input focus to yet another control, such as control 1207, the shared component 1223 again detects the change in focus and retrieves and restores the value of the DefaultPanel property (which is still the writing surface) that was previously cached. Thus, the previously-displayed writing pad is restored. The shared component 1223 then returns to step 1107, to determine if the value of the DefaultPanel property is Default. In this case, the DefaultPanel property of the control 1207 also is Default, so the shared component 1223 takes no action and the control 1207 leaves the appearance of the data input panel in its current state. Thus, the Default value simply ensures that the current panel type, whatever it may be, gets cached in response to the shared component 1223 receiving a new panel type, and restored when the input focus changes again.

Used of the Shared Component

As discussed in detail above, each utility object employs a single shared component to control the operation of a user interface. Accordingly, each object communicates with the single shared component, and may receive information in response. For example, with some implementations of the invention, the objects and the shared component may employ a Microsoft WIN32 application programming interface to exchange information across different software processes. Using this application programming interface, an object may pass an event "handle" or other reference to the component with instructions to perform a task, and then identify when the shared component has "set" the event to indicate completion of that task. Alternately or additionally, an object may provide instructions to the shared component that requires the shared component to provide a message with data in reply (such as, for example, the status of the data input panel). Still other communication techniques and methods may be employed to communicate information between the objects and the shared component according to different embodiments of the invention.

Figure 13:
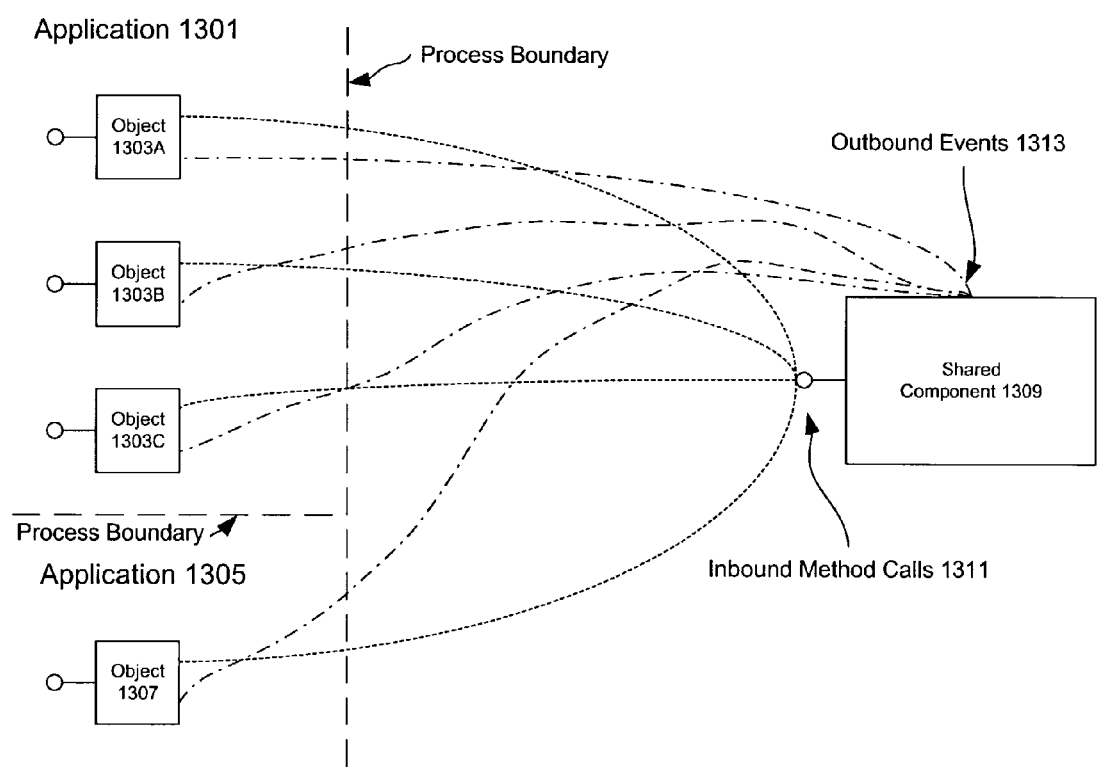
FIG. 13 illustrates one example of how different utility objects employ a single shared component.

One representative relationship between various objects and a shared component that may be used by various embodiments of the invention is illustrated in FIG. 13. As seen in this figure, a software application 1301 may employ a variety of objects 1303. Similarly, another software application 1305 may employ one or more objects 1307. In the illustrated embodiment, for example, the objects 1303 and 1307 may be COM objects created by their respective software applications 1301 and 1305. (An object maintained by a software process is sometimes referred to as an "in-process" object with reference to the software process). Various alternate embodiments of the invention, however, may employ other types of objects in this type of relationship, including software objects that do not employ COM techniques.

Each object 1303 and 1307 communicates with a shared component 1309, which may also be implemented using COM techniques according to some embodiments of the invention. During startup, each object 1303 and 1307 instantiates the shared component 1309. For example, when the objects 1303 and 1307 and the shared component 1309 are implemented using COM techniques, an object 1303 or 1307 may perform a "CoCreate Instance" operation to instantiate the shared component 1309. Because the shared component 1309 may be shared among multiple objects, if the shared component 1309 has already been implemented, then a reference to the existing shared component 1309 is provided to the object in response. Alternately, if the shared component 1309 does not already exist, then the shared component 1309 is created. With the relationship shown in FIG. 13, each object 1303 and 1307 interacts with the shared component 1309 by making method (or function) calls 1311 on the interface of the shared component 1309. The shared component 1309 then returns events 1313 to the objects 1303 and 1307.

While the relationship illustrated in FIG. 13 allows the objects 1303 and 1307 to communicate directly with the shared component 1309, this particular arrangement may occasionally introduce errors. For example, each call from an object 1303 or 1307 to the shared component 1309 is synchronous, and thus should be completed before control is returned to the calling object 1303 or 1307. Accordingly, any events corresponding to a call from an object should be set by the shared component 1309 to confirm completion of that call before control is returned to the calling object 1303 or 1307. Accordingly, if the shared component 1309 fires an event, any delays in the receiving object's handling of that event can make the shared component 1309 completely unresponsive. For example, the application 1305 may display a message box using an interface that receives events from the shared component 1309. Until a user dismisses the message box, the shared component 1309 is unavailable while it waits for a reply to the event to return. Thus, the data input panel could not be employed until the user dismisses the message box.

Also, making this type of cross-process call (going either direction) could trigger re-entrant function calls, resulting in unpredictable behavior. For example, when an object 1303 or 1307 calls a method on the shared component 1309, the shared component 1309 may perform a method in response that leads the shared component 1309 to itself make a call to an external out-of-process object. Thus, if the shared component 1309 is implemented using COM techniques, it may make calls to the standard AddRef, Release or QueryInterface methods, or to any other method implemented by an external software process. While the shared component 1309 is making such a call to a method on an external software process, a small window of time exists during which other calls into the shared component 1309 might be made by a different object, such as one of the objects 1303 and 1307. As a result of this "reentrancy," the order of calls into the shared component 1309 may not be properly synchronized. Thus, in-bound calls into the shared component 1309 could be interrupted by other in-bound calls into the shared component 1309. This reentrancy may create state problems when calls are not completed appropriately before being interrupted. Still further, events fired by the shared component 1309 may not be deterministic, as events may be received in an unpredictable order due to random environmental factors that affect the speed at which calls are processed.

Figure 14:
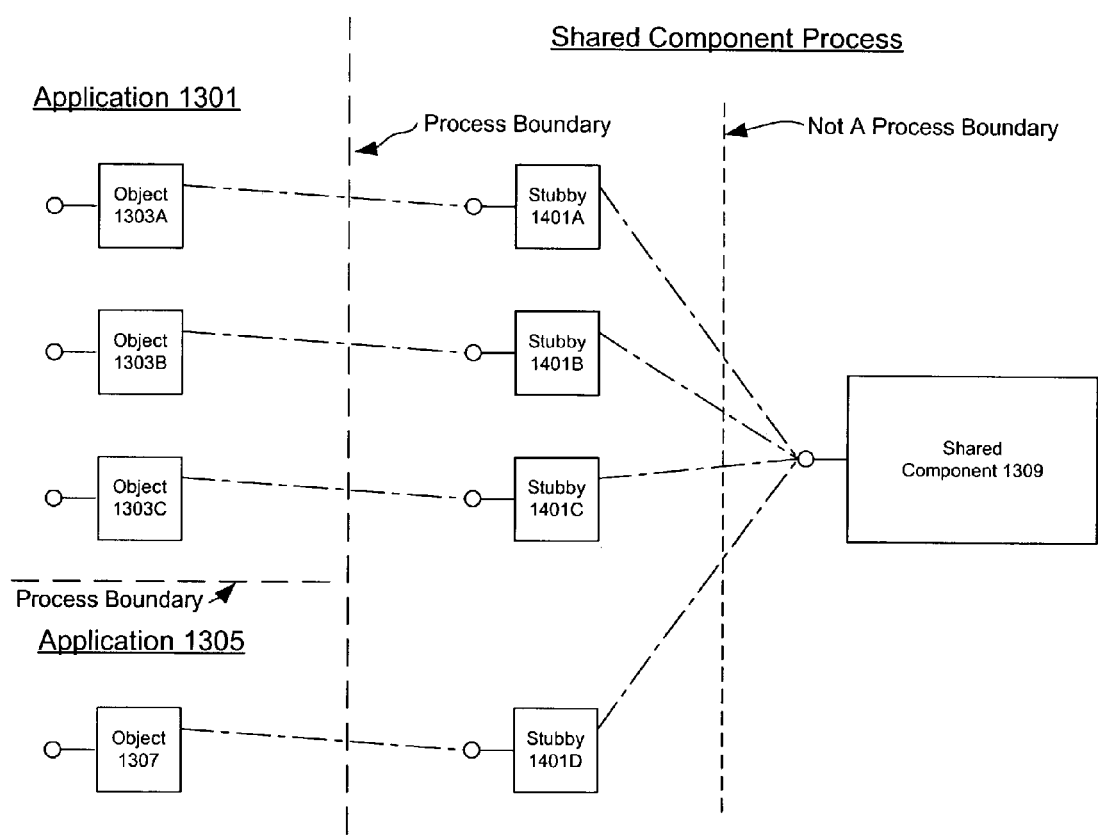
FIGS. 14 and 15 illustrate another example of how different utility objects employ a single shared component.
Figure 15:
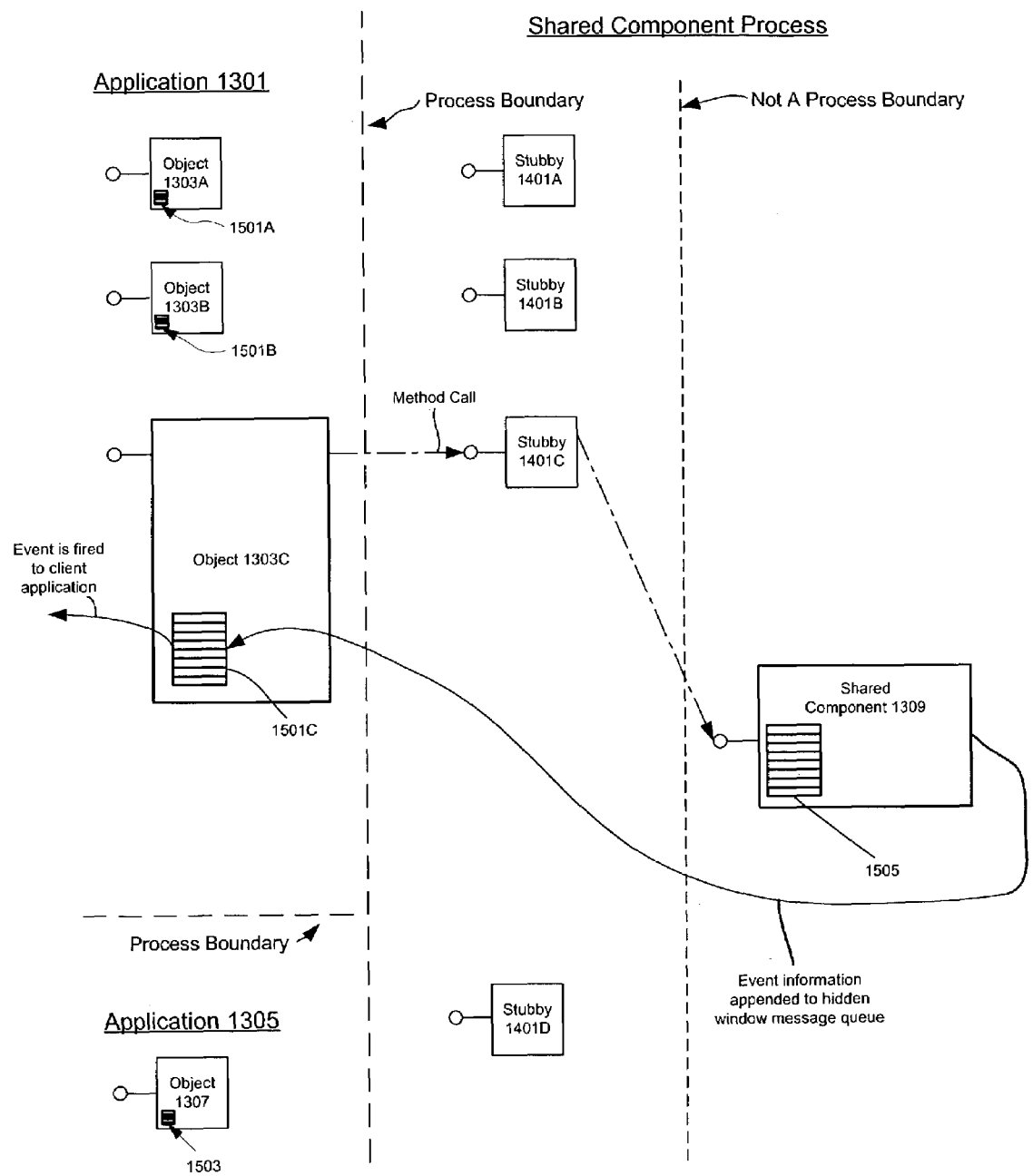

Accordingly, various embodiments of the invention may employ the arrangement illustrated in FIGS. 14 and 15. As shown in FIG. 14, the objects 1303 and 1307 do not send calls directly to the shared component 1309. Instead, each object 1303 and 1307 sends calls to a corresponding proxy or "stubby" component 1401. For example, the object 1303A sends calls to the proxy component 1401A, while the object 1303B sends calls to the proxy component 1401B. Similarly, the object 1303C makes calls to the proxy component 1401C, while the object 1307 makes calls to the proxy component 1401D.

With various embodiments of the invention employing this arrangement, the objects 1303 and 1305 may no longer instantiate the shared component 1309 directly. Instead, an object 1303 or 1305 may instantiate a single proxy component 1401, which then is dedicated to the object 1303 or 1305 invoking it. The first proxy component 1401 that is created may then determine if the shared component 1309 exists, and instantiate the shared component 1309 if it does not already exist. Similarly, the last proxy component 1401 to be destroyed may release the shared component 1309 before ceasing to exist. Proxy components 1401 instantiated between the first-created proxy component 1401 and the last-destroyed proxy component 1401 simply discover and use the previously-created shared component 1309. According to various embodiments of the invention, the proxy component 1401 may be a simple object, such as a simple COM object. As also shown in FIG. 14, the proxy components 1401 have a 1-to-1 mapping to the objects 1303 and 1307 on the other side of the multi-process boundary between the applications 1301 and 1305 and the process of the shared component 1309. More particularly, the process boundaries are represented by the dashed lines in FIG. 14, while the 1-to-1 mapping between the objects 1303 and 1307 and the proxy components 1401, and the many-to-1 mapping between the proxy components 1401 and the shared component 1309 are then represented by dashed and dotted lines.

FIG. 15 illustrates an object and the shared component in greater detail. As seen in this figure, each of the objects 1303 includes a message destination 1501 that may receive messages from a message queue maintained by the application 1301. Similarly, each object 1307 includes a message destination 1503 that may receive messages from a message queue maintained by the application 1305. Each of the message destinations 1501 and 1503 may be, for example, a hidden windowed user interface implemented using the Microsoft WINDOWS® brand operating system or another type of user interface. More particularly, windowed user interfaces implemented using the Microsoft WINDOWS® brand operating system (and other types of user interfaces) provide a message address for receiving messages from a message queue maintained by the application hosting the user interface. These addresses are used by the hosting application to, for example, send input data (such as character data from a keyboard or position data from a pointing device) to the appropriate user interface. Thus, a message address for a hidden windowed user interface may be used as a message destination 1501. It should be appreciated, however, that with alternate embodiments of the invention, other techniques for receiving messages from an application's message queue may be employed.

Similarly, the shared component 1309 also includes a message destination 1505. The message destination 1505 may, for example, be provided by the data input panel user interface associated with the shared component 1309. With some embodiments of the invention, the message destination 1505 may receive messages from a message queue maintained by the shared component 1309 itself, but with other embodiments of the invention the message destination may receive messages from a message queue maintained by another resource. As will be discussed in further detail below, the message destination 1505 may be used to ensure that method calls used by an application behave in a synchronous manner. That is, the message destination 1505 may be used to ensure that each method call is completed before a response is returned to the caller, or before processing begins on another method call.

When an object 1303 or 1305, such as object 1303C determines that a method call should be made to the shared component 1309, it may define an event that can be used to track the state of the method call. For example, if the object 1303C is operating in a Microsoft WINDOWS® brand operating system environment, then the object 1303C may create a Win32 event, as discussed in detail above. Next, the object 1303C calls for the desired method from its corresponding proxy component 1401C. In making the call to the proxy component 1401C, the object 1303C passes a handle for the created event (or other identifying reference) to the proxy component 1401C, along with whatever other parameters are appropriate for the method call. The object 1303C also passes a handle (or other identifying reference) identifying its message destination 1501 C to the shared component 1309.

In response to receiving the method call, the proxy component 1401C posts a message relaying the method call to the message destination 1503 of the shared component 1309. It also duplicates the event handle, and passes the event handle (or its duplicate) to the shared component 1309, in order to give the shared component 1309 control over the event corresponding to that method call. All of the parameters required to execute the method call are packaged together so that they can be sent to the shared component 1309 as message parameters with the event handle and the call message. Advantageously, this arrangement allows multiple proxy components 1401 to post messages requesting method calls to the message destination 1503 of the shared component 1309 in whatever order that the method calls are received from their corresponding objects 1303 and 1307. Using its message queue, the shared component 1309 may then process calls in the order in which they are received from the objects 1303 and 1307. Further, any interfaces that are passed to a proxy component 1401 may be engaged by the shared component 1309 only after the message calling the method is posted to the message queue in the interface 1505 of the shared component 1309. Thus, the shared component 1309 will not be "aware" of the method call before the message is posted to the message queue, thereby avoiding reentrancy and ensuring that the shared component 1309 performs the method call using the appropriate data. Once the message requesting the method has been posted to the interface 1505, the proxy component 1401 returns execution to the calling object 1303 or 1307.

In response to receiving execution control from the proxy component 1401, the object 1303 or1307 waits for the called method to be completed. For example, if object 1303 or 1307 is a COM object, then it may issue a CoWaitForEvent to wait for the defined event to be returned (or "set") by the shared component 1309 before continuing with another function. It should be noted that this process may be employed when the desired method must be performed in a synchronous manner. If, for example, an object 1303 or 1307 simply notifies the shared component 1309 of an occurrence for informational purposes, then the creation of an event and subsequent wait for the event to be set may be omitted.

The shared component 1309 works its way through the messages sent to its message destination 1505, performing each method in the order of its request in the message queue. If, for example, the shared component 1309 is implemented using COM techniques, then the messages may be extracted from the message queue using the GetMessage operation. Accordingly, in the illustrated example, when the shared component 1309 reaches the message posted by the proxy component 1401C, it performs the requested action. Also, if appropriate, after it has performed the requested action, the shared component 1309 posts a corresponding notification message with the results of the performed method to the message destination 1501C of the object 1303C. For example, if the shared component 1309 is implemented using COM techniques, it may employ the PostMessage process to post the notification message to the message destination 1501C. It should be noted that a variety of techniques can be used to post messages to the message destinations 1501 and 1503. For example, if the Microsoft WINDOWS® brand operating system WIN32 messaging techniques are employed, ATOMs may be used to encode data that cannot be passed in the standard WPARAM and LPARAM parameters to avoid issues with marshalling data created by the cross process nature of COM objects. Posting the notification message to the message destination 1501 (or the message destination 1503) rather than directly providing the method results to the object 1303 or 1307 may thus prevent re-entrant situations, and ensure that the order of events sent by the singleton to the object 1303 or 1307 corresponds to the order in which method calls were made by the object 1303 or 1307.

Further, the shared component 1309 sets the event with corresponding to the performed method, to indicate that the requested method has been completed. When the shared component 1309 sets the event (given by the event handle that was passed through previously), if frees up the object 1303 or 1307 that defined the event, thereby allowing the object 1303 or 1307 to resume processing from where it called the method. For example, if the object 1303 or 1307 expects returned information from a method call, the object 1303 or 1307 will check the message queue for the expected information upon detecting that the event corresponding to the method call has been set.

It should be noted that, with various embodiments of the invention, an object 1303 or 1307 may omit creating an event. For example, with some types of method calls, an object 1303 or 1307 may simply desire to post information to the shared component 1309, without expecting a reply. In addition, for some embodiments of the invention, an object 1303 or 1307 may make a method call to the shared component 1309 without posting a message to the message destination 1505. For example, some embodiments of the invention may allow an object 1303 or 1307 to inquire to the shared component 1309 regarding the status of the data input panel (e.g., an inquiry as to whether the data input panel is busy). Because this type of method call is quickly processed, thereby reducing the opportunity for reentry, and must be immediately received back by the calling object 1303 or 1307 to be useful, this type of method call may be passed directly to the shared component 1309 without having a corresponding message posted to the message destination 1505 of the shared component 1309.

CONCLUSION

While the invention has been described with respect to specific examples including presently preferred modes of carrying out the invention, those skilled in the art will appreciate that there are numerous variations and permutations of the above described systems and techniques. For example, while the data entry graphical user interface is controlled by individual software applications through utility objects according to various embodiments of the invention described above, with alternate embodiments of the invention the features of the data input panel may be determined by other sources, such as the location of the insertion point throughout the system.

Thus, the spirit and scope of the invention should be construed broadly as set forth in the appended claims.

What is claimed is:

1. A method of controlling a user interface presented on a display comprising:
    receiving information from a software application, the information identifying a displayed first edit control and a position of the displayed first edit control; and invoking the user interface for receiving handwritten input to appear at a position offset from and outside a boundary of the displayed first edit control, wherein information is input into the edit control based on the handwritten input wherein upon determination that the user interface of the handwritten input is not appropriate, the user interface of the handwritten input is automatically changed to a keyboard user interface when the user seeks to enter data into the edit control.

2. The method recited in claim 1, further comprising:
    invoking the user interface to appear at a position vertically offset from a boundary of the displayed first edit control.

3. The method recited in claim 1, further comprising:
    invoking the user interface to appear at a position horizontally offset from a boundary of the displayed first edit control.

4. The method recited in claim 1, further comprising:
    invoking the user interface to appear at a position horizontally and vertically offset from a boundary of the displayed first edit control.

5. The method recited in claim 1, further comprising:
    invoking the user interface to have a specified boundary size.

6. The method recited in claim 1, wherein the information further includes size information for a boundary of the displayed first edit control.

7. The method recited in claim 6, further comprising:
invoking the user interface to appear within the displayed first edit control.

8. The method recited in claim 7, further comprising:
invoking the user interface to appear at a position vertically offset from a boundary of the displayed first edit control.

9. The method recited in claim 7, further comprising:
invoking the user interface to appear at a position horizontally offset from a boundary of the displayed first edit control.

10. The method recited in claim 1, wherein the information further includes a boundary of a work area.

11. The method recited in claim 10, further comprising:
invoking the user interface to appear at a specified position relative to the displayed first edit control and the boundary of the work area.

12. The method recited in claim 1, wherein the information further includes position information for a displayed second edit control.

13. The method recited in claim 12, further comprising:
invoking the user interface to appear at a specified position relative to one of the displayed first edit control and the displayed second edit control.

14. The method recited in claim 1, wherein the information identifies a type of the displayed first edit control.

15. The method recited in claim 14, further comprising:
invoking the user interface to include an input surface configured to receive user input corresponding to the identified type of the displayed first edit control.

16. The method recited in claim 15, further comprising:
invoking the user interface to include a keyboard input surface.

17. The method recited in claim 15, further comprising:
invoking the user interface to include a writing input surface.

18. The method recited in claim 15, further comprising:
invoking the user interface to include an Asian language writing input surface.

19. The method recited in claim 1, further comprising:
receiving the at a utility object; and
in response to receiving the information, having the utility object control instruct an application programming interface to invoke the user interface.

20. The method recited in claim 1, further comprising:
employing an invocation technique for invoking the user interface based upon the received information.

21. The method recited in claim 20, wherein the user interface is invoked in response to activation of a target.

22. The method recited in claim 21, wherein the target is activated when a pointing device moves proximal to the target.

23. The method recited in claim 21, wherein the target is activated when a pointing device moves over the target.

24. The method recited in claim 21, wherein the target is activated when a pointing device is held over the target for a predetermined period of time.

25. The method recited in claim 1, farther comprising employing a dismissal technique for dismissing the user interface based upon the received information.

* * * * *

UNITED STATES PATENT AND TRADEMARK OFFICE
CERTIFICATE OF CORRECTION

PATENT NO. : 7,490,296 B2  Page 1 of 1
APPLICATION NO. : 10/427159
DATED : February 10, 2009
INVENTOR(S) : Kyril Feldman et al.

It is certified that error appears in the above-identified patent and that said Letters Patent is hereby corrected as shown below:

Column 26,
Line 10, after "receiving the" insert -- information --.

Signed and Sealed this

Twenty-fourth Day of March, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,490,296 B2  
APPLICATION NO. : 10/427159  
DATED : February 10, 2009  
INVENTOR(S) : Kyril Feldman et al.

Page 1 of 1

It is certified that error appears in the above-identified patent and that said Letters Patent is hereby corrected as shown below:

In Title page, in field (75), under "Inventors" column 1, line 5, delete "Tobiasz Zielinski," and insert -- Tobias Zielinski, --, therefor.

In column 26, line 27, in Claim 25, delete "farther" and insert -- further --, therefor.

Signed and Sealed this  
Tenth Day of May, 2011

David J. Kappos  
*Director of the United States Patent and Trademark Office*